United States Patent
Seo et al.

(10) Patent No.: US 9,706,540 B2
(45) Date of Patent: *Jul. 11, 2017

(54) METHOD AND APPARATUS FOR ENHANCED CONTROL CHANNEL-BASED OPERATION IN WIRELESS COMMUNICATION SYSTEM

(71) Applicant: LG ELECTRONICS INC., Seoul (KR)

(72) Inventors: Hanbyul Seo, Anyang-si (KR); Dongyoun Seo, Anyang-si (KR); Inkwon Seo, Anyang-si (KR); Kijun Kim, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,562

(22) Filed: Oct. 7, 2015

(65) Prior Publication Data

US 2016/0028526 A1    Jan. 28, 2016

Related U.S. Application Data

(63) Continuation of application No. 14/370,202, filed as application No. PCT/KR2013/000411 on Jan. 18, 2013, now Pat. No. 9,191,945.

(Continued)

(51) Int. Cl.
*H04W 4/00* (2009.01)
*H04W 72/04* (2009.01)
(Continued)

(52) U.S. Cl.
CPC .......... *H04W 72/042* (2013.01); *H04L 1/16* (2013.01); *H04L 1/1861* (2013.01);
(Continued)

(58) Field of Classification Search
CPC .......................... H04W 4/00; H04W 72/0413
(Continued)

(56) References Cited

U.S. PATENT DOCUMENTS 8,842,628 B2 * 9/2014 Gao ..................... H04L 5/0016
370/329
8,913,576 B2   12/2014 Shan et al.
(Continued)

FOREIGN PATENT DOCUMENTS

CN         101651995       2/2010
CN         101816158       8/2010
(Continued)

OTHER PUBLICATIONS

Ericsson, et al., "PUCCH resource allocation for ePDCCH," 3GPP TSG-RAN WG1 Meeting #70, R1-123870, Aug. 2012, 4 pages.
(Continued)

*Primary Examiner* — Iqbal Zaidi
(74) *Attorney, Agent, or Firm* — Lee, Hong, Degerman, Kang & Waimey

(57) ABSTRACT

The present invention relates to a wireless communication system, and more specifically, to a method and an apparatus for enhanced-control channel-based operation. A method for a terminal for transmitting confirmation response information in a wireless communication system according to one embodiment of the present invention comprises a step for transmitting confirmation response information for a downlink data channel by means of an uplink control channel resource, wherein an index for the uplink control channel resource can be determined on the basis of a delegate antenna port of a downlink control channel derived from the identifier of the terminal.

12 Claims, 11 Drawing Sheets

Related U.S. Application Data

(60) Provisional application No. 61/588,142, filed on Jan. 18, 2012, provisional application No. 61/591,276, filed on Jan. 27, 2012, provisional application No. 61/598,311, filed on Feb. 13, 2012, provisional application No. 61/614,478, filed on Mar. 22, 2012, provisional application No. 61/644,409, filed on May 8, 2012, provisional application No. 61/706,789, filed on Sep. 28, 2012, provisional application No. 61/721,507, filed on Nov. 2, 2012.

(51) Int. Cl.
*H04L 1/18* (2006.01)
*H04L 5/00* (2006.01)
*H04L 1/16* (2006.01)

(52) U.S. Cl.
CPC .......... *H04L 5/0023* (2013.01); *H04L 5/0048* (2013.01); *H04L 5/0055* (2013.01); *H04L 5/0092* (2013.01); *H04W 72/0406* (2013.01); *H04W 72/0413* (2013.01); *H04L 5/0053* (2013.01)

(58) Field of Classification Search
USPC .................................................. 370/328–339
See application file for complete search history.

(56) References Cited

U.S. PATENT DOCUMENTS

| | | | |
|---|---|---|---|
| 9,197,387 | B2 | 11/2015 | Nory et al. |
| 2009/0097447 | A1 | 4/2009 | Han et al. |
| 2009/0238091 | A1 | 9/2009 | Kim et al. |
| 2009/0257449 | A1 | 10/2009 | Chen et al. |
| 2010/0279628 | A1 | 11/2010 | Love et al. |
| 2011/0021228 | A1 | 1/2011 | Kim et al. |
| 2011/0038275 | A1 | 2/2011 | Kim et al. |
| 2011/0235599 | A1* | 9/2011 | Nam .................. H04L 1/0027 370/329 |
| 2011/0243066 | A1* | 10/2011 | Nayeb Nazar .......... H04L 1/007 370/328 |
| 2011/0269492 | A1 | 11/2011 | Wang |
| 2011/0286413 | A1 | 11/2011 | Nishio et al. |
| 2012/0195267 | A1 | 8/2012 | Dai et al. |
| 2013/0039284 | A1 | 2/2013 | Marinier et al. |
| 2013/0044722 | A1 | 2/2013 | Kang et al. |
| 2013/0064216 | A1 | 3/2013 | Gao et al. |
| 2013/0100901 | A1 | 4/2013 | Shan et al. |
| 2013/0114529 | A1 | 5/2013 | Chen et al. |
| 2013/0121304 | A1 | 5/2013 | Nory et al. |
| 2013/0128832 | A1 | 5/2013 | Kang et al. |
| 2013/0223402 | A1 | 8/2013 | Feng et al. |
| 2015/0124760 | A1 | 5/2015 | Seo et al. |

FOREIGN PATENT DOCUMENTS

| | | |
|---|---|---|
| CN | 101981989 | 2/2011 |
| CN | 102014510 | 4/2011 |
| CN | 102104962 | 6/2011 |
| CN | 102316595 | 1/2012 |
| EP | 2383928 | 11/2011 |
| EP | 2566088 | 3/2013 |
| JP | 2014527750 | 10/2014 |
| KR | 10-2008-0097898 | 11/2008 |
| KR | 10-2009-0034263 | 4/2009 |
| KR | 1020090034263 | 4/2009 |
| KR | 10-2010-0091095 | 8/2010 |
| KR | 10-2011-0090906 | 8/2011 |
| KR | 10-2011-0134305 | 12/2011 |
| WO | 2011/032342 | 3/2011 |
| WO | 2011-032342 | 3/2011 |
| WO | 2011032342 | 3/2011 |
| WO | 2011/053051 | 5/2011 |
| WO | 2011-054188 | 5/2011 |
| WO | 2011/099663 | 8/2011 |
| WO | 2011/136523 | 11/2011 |
| WO | 2011/136584 | 11/2011 |
| WO | 2012/109542 | 8/2012 |
| WO | 2013000411 | 1/2013 |
| WO | 2013022244 | 2/2013 |
| WO | 2013/037059 | 3/2013 |

OTHER PUBLICATIONS

European Patent Office Application Serial No. 13739007.6, Search Report dated May 7, 2015, 9 pages.
U.S. Appl. No. 14/370,202, Office Action dated Mar. 13, 2015, 17 pages.
PCT International Application No. PCT/KR2013/000411, Written Opinion of the International Searching Authority dated Apr. 23, 2013, 1 page.
Alcatel-Lucent Shanghai Bell, et al., "PUCCH resource mapping with ePDCCH," 3GPP TSG RAN WG1 Meeting #67 ,, R1-114066, Nov. 2011, 2 pages.
InterDigital Communications, LLC, "On PUCCH resource allocation for ePDCCH based A/N," 3GPP TSG-RAN WG1 Meeting #70, R1-123413, Aug. 2012, 3 pages.
U.S. Appl. No. 14/370,204, Notice of Allowance dated Jan. 12, 2016, 9 pages.
U.S. Appl. No. 14/593,765 Office Action dated Sep. 23, 2015, 16 pages.
U.S. Appl. No. 14/593,765 Final Office Action dated Mar. 7, 2016, 22 pages.
U.S. Appl. No. 14/370,204, Office Action dated May 29, 2015, 10 pages.
U.S. Appl. No. 14/370,204, Final Office Action dated Sep. 3, 2015, 10 pages.
PCT International Application No. PCT/KR2013/000428, Written Opinion of the International Searching Authority dated Apr. 19, 2013, 1 page.
The State Intellectual Property Office of the People's Republic of China Application Serial No. 201380005628.4, Office Action dated Aug. 17, 2016, 18 pages.
The State Intellectual Property Office of the People's Republic of China Application Serial No. 201380005664.0, Office Action dated Jul. 5, 2016, 12 pages.
Samsung, "DM-RS based Distributed and Localized E-PDCCH structure," 3GPP TSG RAN WG1 #67, R1-114396, Nov. 2011, 4 pages.
LG Electronics, "Details of association between DMRS ports and EPDCCH transmission," 3GPP TSG RAN WG1 Meeting #70bis, R1-124325, Oct. 2012, 4 pages.
Ericsson, et al., "Remaining details on antenna ports," 3GPP TSG-RAN WG1 #70, R1-123617, Aug. 2012, 4 pages.
Samsung, "Association between antenna ports and ePDCCH transmissions," 3GPP TSG RAN WG1 #69, R1-122249, May 2012, 6 pages.
European Patent Office Application Serial No. 13738623.1, Search Report dated Sep. 21, 2015, 10 pages.
Panasonic, "Search space design for enhanced PDCCH", R1-120236, 3GPP TSG RAN WG1 Meeting #68, Feb. 2012, 4 pages.
Research in Motion, UK Limited, "Further Discussion on Reference Signals for E-PDCCH", R1-120332, 3GPP TSG RAN WG1 Meeting #68, Feb. 2012, 5 pages.
NTT Docomo, "DM-RS Design for E-PDCCH in Rel-11", R1-114302, 3GPP TSG RAN WG1 Meeting #67, Nov. 2011, 3 pages.
U.S. Appl. No. 14/593,765, Office Action dated Jan. 17, 2017, 13 pages.
The State Intellectual Property Office of the People's Republic of China Application Serial No. 201380005664.0, Office Action dated Mar. 10, 2017, 18 pages.

* cited by examiner

METHOD AND APPARATUS FOR ENHANCED CONTROL CHANNEL-BASED OPERATION IN WIRELESS COMMUNICATION SYSTEM

CROSS-REFERENCE TO RELATED APPLICATIONS

This application is a continuation of U.S. patent application Ser. No. 14/370,202, filed on Jul. 1, 2014, now U.S. Pat. No. 9,191,945, which is the National Stage filing under 35 U.S.C. 371 of International Application No. PCT/KR2013/000411, filed on Jan. 18, 2013, which claims the benefit of U.S. Provisional Application Nos. 61/588,142, filed on Jan. 18, 2012, 61/591,276, filed on Jan. 27, 2012, 61/598,311, filed on Feb. 13, 2012, 61/614,478, filed on Mar. 22, 2012, 61/644,409, filed on May 8, 2012, 61/706,789, filed on Sep. 28, 2012 and 61/721,507, filed on Nov. 2, 2012, the contents of which are all hereby incorporated by reference herein in their entirety.

TECHNICAL FIELD

The present invention relates to a wireless communication system, and more particularly, to a method and apparatus for an enhanced-control channel-based operation.

BACKGROUND ART

A user equipment (UE) detects a downlink (DL) control channel for carrying scheduling information about DL data transmission and accordingly receives DL data from an eNB. The UE generates acknowledgement/negative-acknowledgement (ACK/NACK) information indicating whether decoding of DL data is successful and transmits the ACK/NACK information to the eNB.

In a conventional wireless communication system, a resource used for transmission of ACK/NACK information may be determined from a DL control channel for carrying the DL scheduling information. In addition, in the conventional wireless communication system, the DL control channel is transmitted based on an antenna port of a cell-specific reference signal, and a UE detects and demodulates the DL control channel based on an estimated channel using an antenna port of the cell-specific reference signal.

DISCLOSURE

Technical Problem

In an enhanced wireless communication system, an enhanced physical downlink control channel (E-PDCCH) may be used. The E-PDCCH may be transmitted based on a demodulation reference (DMRS) but not a cell-specific reference signal and may support multi-user multiple input multiple output (MU-MIMO).

When a method of determining a resource for transmission of acknowledgement/negative-acknowledgement (ACK/NACK) is used, a problem arises in that the same resource for transmission of ACK/NACK information about downlink (DL) data transmitted according to different pieces of scheduling information may be determined (i.e., collision). In addition, when one E-PDCCH is transmitted using a plurality of resource regions, since antenna ports corresponding to the respective resource regions are different, an antenna port as a reference is determined in order to appropriately perform E-PDCCH transmission of an eNB and E-PDCCH demodulation of a UE.

The present invention provides a method of effectively and appropriately determining an uplink (UL) ACK/NACK transmission resource in relation to an E-PDCCH. In addition, the present invention also provides a method of accurately determining an antenna port in relation to an E-PDCCH to support an appropriate operation by a transmitter and receiver of the E-PDCCH.

It is to be understood that both the foregoing general description and the following detailed description of the present invention are exemplary and explanatory and are intended to provide further explanation of the invention as claimed.

Technical Solution

The object of the present invention can be achieved by providing a method of transmitting acknowledgement/negative-acknowledgement (ACK/NACK) information by a user equipment (UE) in a wireless communication system, the method including transmitting ACK/NACK information to a downlink (DL) data channel using an uplink (UL) control channel resource, wherein an index of the UL control channel resource is determined based on an index of a representative antenna port of a DL control channel, derived from an identifier of the UE.

In another aspect of the present invention, provided herein is a user equipment (UE) for transmitting acknowledgement/negative-acknowledgement (ACK/NACK) information in a wireless communication system, the UE including a receiver, a transmitter, and a processor, wherein the processor is configured to transmit ACK/NACK information to a downlink (DL) data channel using an uplink (UL) control channel resource through the transmitter, and an index of the UL control channel resource is determined based on an index of a representative antenna port of a DL control channel, derived from an identifier of the UE.

The following features can be commonly applied to embodiments of the present invention.

The index of the representative antenna port of the DL control channel may be an index of an antenna port corresponding to a representative control channel element (CCE), derived from the identifier of the UE among a plurality of CCEs of the DL control channel.

An index of the UL control channel resource may be $n^*+k+N_{offset}^{PUCCH}$, $n^*$ may be a value corresponding to an index of the representative CCE, k may be a value indicted by a predetermined field of a downlink control information (DCI) format of the DL control channel, and $N_{offset}^{PUCCH}$ may be an offset value indicating a start point of the UL control channel resource region via higher layer signaling.

The index of the antenna port derived from the identifier of the UE may be AP, $AP=p+n'*Z$, p may be a minimum value of antenna port indexes available for the DL control channel, n' may be a parameter for determination of an index of the representative CCE, and Z may be 1 or 2.

$n'=(n_{CCE} \bmod d)+(X \bmod \min(L,d))$, $n_{CCE}$ may be a lowest value of CCE indexes used for transmission of the DL control channel, d may be a number of CCEs formed on one resource block pair, X may be the identifier of the UE, L may be an aggregation level of the DL control channel, mod may be modulo calculation, and min(L,d) may be a minimum value of L and d.

The identifier of the UE may be $n_{RNTI}$.

The antenna port derived from the identifier of the UE may be an antenna port of a reference signal used for demodulation of the DL control channel.

When the UE uses the UL control channel resource and an additional UL control channel resource in order to transmit the ACK/NACK information, an index of the additional UL control channel resource may be determined according to the index of the UL control channel resource+1.

An aggregation level of the DL control channel may be equal to or greater than 2.

The DL control channel may be transmitted in a localized manner.

Transmission of the DL data channel may be indicated by detection of the DL control channel.

The wireless communication system may support frequency division duplex (FDD).

The ACK/NACK information to the DL data channel in a subframe (n−4) may be transmitted in a subframe n.

The UL control channel may be a physical uplink control channel (PUCCH), the DL control channel may be an enhanced-physical downlink control channel (E-PDCCH), the DL data channel may be a physical downlink data channel (PDSCH), and the CCE may be an enhanced CCE (ECCE).

It is to be understood that both the foregoing general description and the following detailed description of the present invention are exemplary and explanatory and are intended to provide further explanation of the invention as claimed.

Advantageous Effects

The present invention provides a method of effectively and appropriately determining an uplink (UL) acknowledgement/negative-acknowledgement (ACK/NACK) transmission resource in relation to an E-PDCCH. In addition, the present invention also provides a method of accurately determining an antenna port in relation to an E-PDCCH to support an appropriate operation by a transmitter and receiver of the E-PDCCH.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
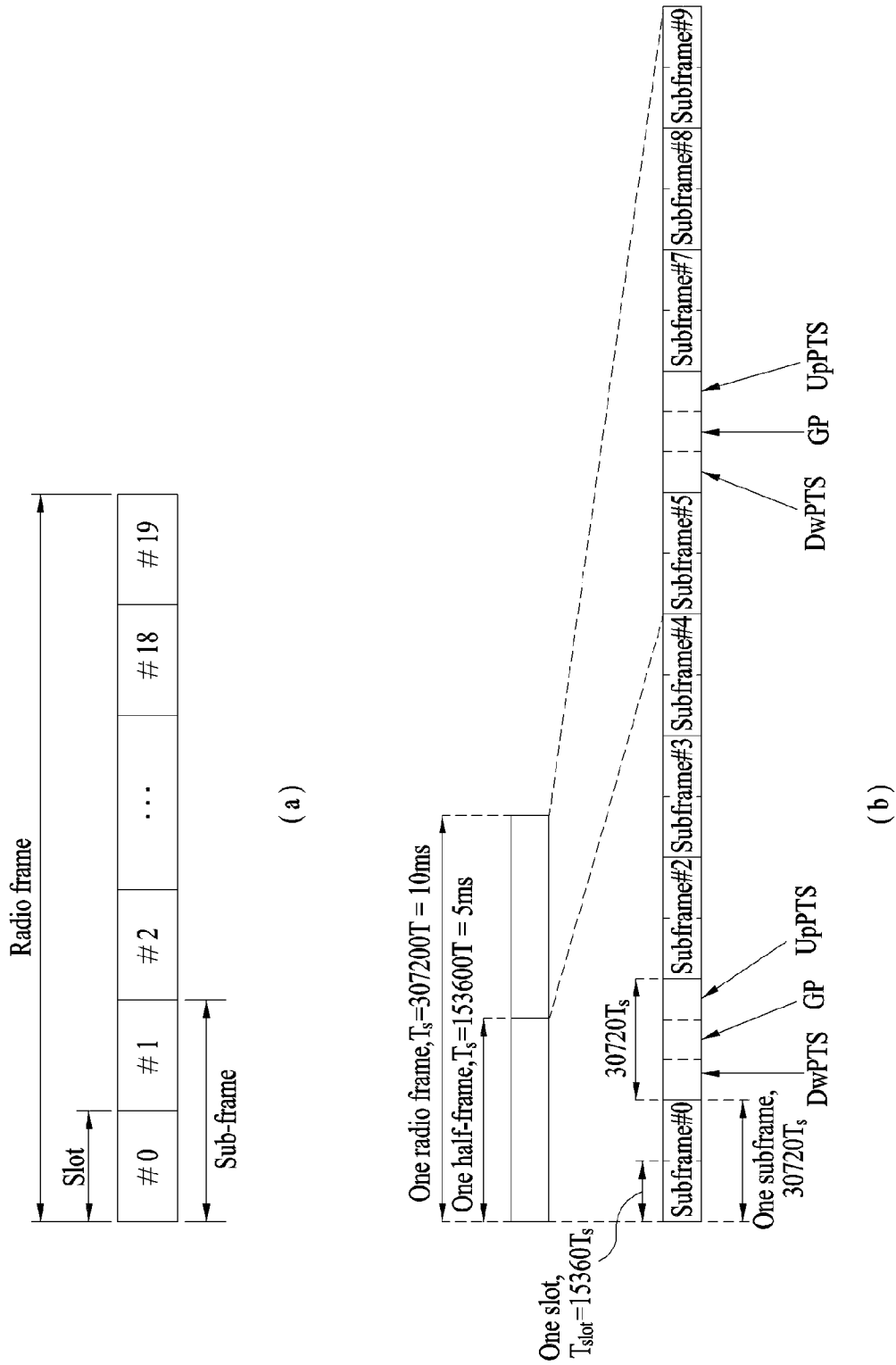
FIG. 1 is a diagram illustrating a structure of a radio frame.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "relay" may be replaced with the terms relay node (RN) or relay station (RS). The term "terminal" may also be replaced with a user equipment (UE), a mobile station (MS), a mobile subscriber station (MSS) or a subscriber station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (utra) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink (DL) and employs SC-FDMA in uplink (UL). LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

Radio Frame Structure

With reference to FIG. 1, a structure of a radio frame of a 3GPP LTE system will be described below.

In a cellular orthogonal frequency division multiplexing (OFDM) wireless packet communication system, UL/DL data packets are transmitted in subframes. One subframe is defined as a predetermined time interval including a plurality of OFDM symbols. The 3GPP LTE standard supports a type 1 radio frame structure applicable to frequency division duplex (FDD) and a type 2 radio frame structure applicable to time division duplex (TDD).

FIG. 1(a) is a diagram illustrating the structure of the type 1 radio frame. One radio frame includes 10 subframes, each subframe including two slots in the time domain. A time required for transmitting one subframe is defined as a transmission time interval (TTI). For example, one subframe may be 1 ms long and one slot may be 0.5 ms long. One slot includes a plurality of OFDM symbols in the time domain and a plurality of resource blocks (RBs) in the frequency domain. Since the 3GPP LTE system uses OFDMA for DL, an OFDM symbol may be one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a cyclic prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is instable as is the case with a fast UE, the extended CP may be used in order to further reduce inter-symbol interference.

FIG. 1(b) illustrates the structure of the type 2 radio frame. The type 2 radio frame includes two half frames, each half frame including 5 subframes, a DL pilot time slot (DwPTS), a guard period (GP), and a UL pilot time slot (UpPTS). One subframe is divided into two slots. The DwPTS is used for initial cell search, synchronization, or channel estimation at a UE, and the UpPTS is used for channel estimation and UL transmission synchronization with a UE at an eNB. The GP is used to cancel UL interference between UL and DL, caused by the multi-path delay of a DL signal. One subframe includes two slots irrespective of a type of radio frame.

The aforementioned radio frame structure is purely exemplary. The number of subframes included in a radio frame or the number of slots included in each subframe, and the number of symbols of each slot can be changed in various ways.

Figure 2:
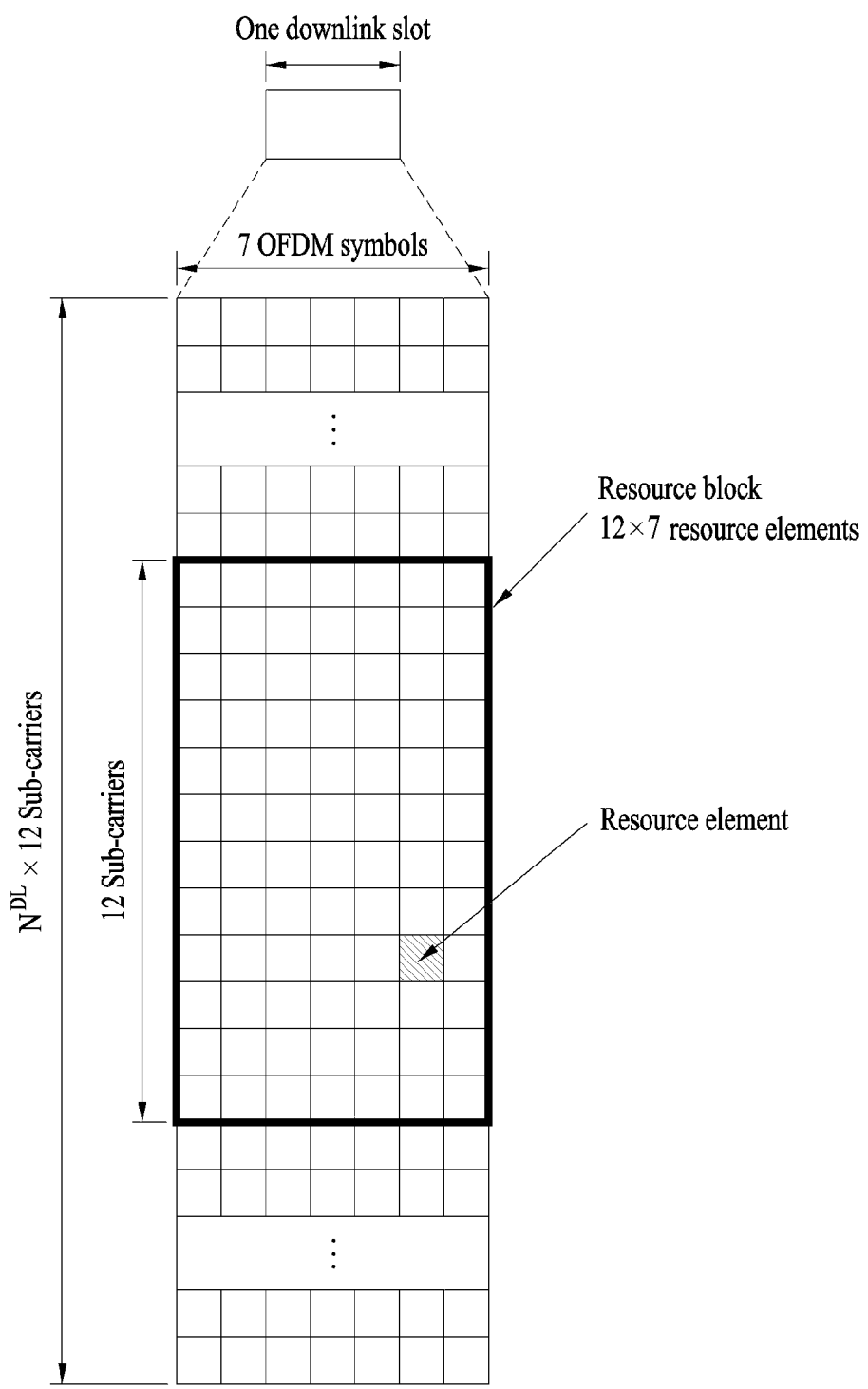
FIG. 2 is a diagram illustrating a resource grid.

FIG. 2 illustrates the structure of a DL resource grid for the duration of one DL slot. One DL slot includes 7 OFDM symbols in the time domain and one resource block includes 12 subcarriers in the frequency domain, which is purely exemplary, but embodiments of the present invention are not limited thereto. For example, in the case of normal cyclic prefix (CP), one slot may include 7 OFDM symbols, but in the case of extended-CP, one slot may include 6 OFDM symbols. Each element of the resource grid is referred to as a resource element (RE). One resource block includes 12×7 REs. The number of RBs in a DL slot, $N^{DL}$ depends on a DL transmission bandwidth. A UL slot may have the same structure as a DL slot.

DL Subframe Structure

Figure 3:
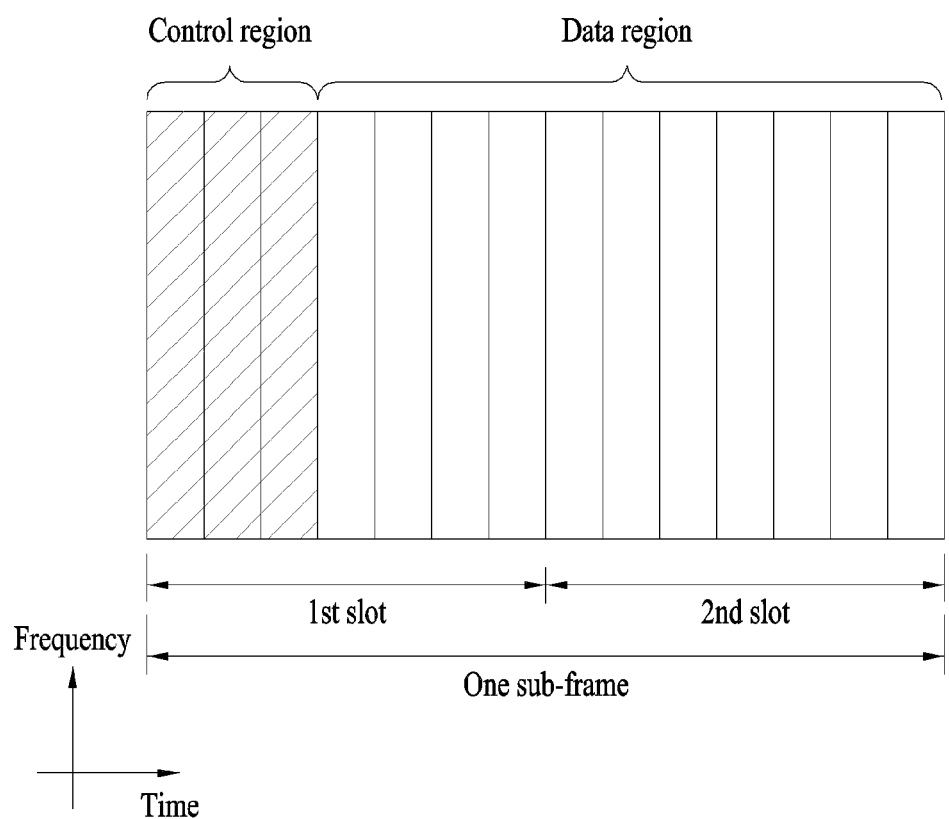
FIG. 3 is a diagram illustrating a structure of a downlink (DL) subframe.

FIG. 3 illustrates a structure of a DL subframe. Up to three or four OFDM symbols at the start of the first slot of a DL subframe are used as a control region to which control channels are allocated and the other OFDM symbols of the DL subframe are used as a data region to which a PDSCH is allocated. DL control channels defined for the 3GPP LTE system include a physical control format indicator channel (PCFICH), a physical downlink control channel (PDCCH), and a physical hybrid-ARQ indicator channel (PHICH). The PCFICH is located in the first OFDM symbol of a subframe, carrying information about the number of OFDM symbols used for transmission of control channels in the subframe. The PHICH delivers an HARQ acknowledgement/negative-acknowledgement (ACK/NACK) signal as a response to a UL transmission. Control information carried on the PDCCH is called downlink control information (DCI). The DCI includes UL or DL scheduling information, UL transmission power control commands for a random UE group.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of Tx power control commands for individual UEs of a UE group, Tx power control commands, voice over Internet protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of RE groups (REGs). The format of a PDCCH and the number of available bits for the PDCCH are determined according to the number of CCEs and a coding rate provided by the CCEs. An eNB determines a PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is destined for a specific UE, the CRC may be masked by a cell-RNTI (C-RNTI) of the UE. If the PDCCH carries a paging message, the CRC of the PDCCH may be masked by a paging indicator identifier (P-RNTI). If the PDCCH carries system information, particularly, a system information block (SIB), its CRC may be masked by a system information ID and a system information RNTI (SI-RNTI). To indicate that the PDCCH carries a random access response to a random access preamble transmitted by a UE, its CRC may be masked by a random access-RNTI (RA-RNTI).

PDCCH Processing

In PDCCH transmission, control channel elements (CCEs), contiguous logical allocation units, are used to map a PDCCH to REs. One CCE includes a plurality of (e.g., 9) REGs and one REG includes four neighboring REs except for a RS.

The number of CCEs necessary for a specific PDCCH depends on a DCI payload corresponding to a control information size, a cell bandwidth, a channel coding rate, etc. Specifically, the number of CCEs for a specific PDCCH can be defined according to PDCCH format, as shown in Table 1 below.

TABLE 1

| PDCCH format | Number of CCEs | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

While one of the above-mentioned PDCCH formats may be used, this is not signaled to a UE. Accordingly, the UE performs decoding without knowing the PDCCH format, which is referred to as blind decoding. Since operation overhead is generated if a UE decodes all CCEs that can be used for downlink for each PDCCH, a search space is defined in consideration of limitation for a scheduler and the number of decoding attempts.

That is, the search space is a set of candidate PDCCHs composed of CCEs on which a UE needs to attempt to perform decoding at an aggregation level. The aggregation level and the number of candidate PDCCHs can be defined as shown in Table 2 below.

TABLE 2

| | Search space | | The number of PDCCH candidates |
| --- | --- | --- | --- |
| | Aggregation level | Size (CCE unit) | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown Table 2, the UE has a plurality of search spaces at each aggregation level because 4 aggregation levels are present. The search spaces may be divided into a UE-specific search space and a common search space, as shown in Table 2. The UE-specific search space is for a specific UE. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space is used for a case in which a plurality of UEs or all UEs needs to receive PDCCHs, for system information dynamic scheduling or paging messages, for example. The common search space may be used for a specific UE for resource management. Furthermore, the common search space may overlap with the UE-specific search space.

As described above, the UE attempts to decode a search space. In this regard, a number of times of decoding are determined according to a transmission mode determined via radio resource control (RRC) signaling and a DCI format. When carrier aggregation is not applied, the UE needs to consider two DCI sizes (DCI format 0/1A/3/3A and DCI format 1C) for each of 6 PDCCH candidates with respect to the common search space, and thus, up to 12 decoding attempts are required. With respect to the UE-specific search space, two DCI sizes are considered for a PDCCH candidate number (6+6+2+2=16), up to 32 decoding attempts are required. Accordingly, when carrier aggregation is not applied, up to 44 decoding attempts are required.

Enhanced-Control Channel

As an example of an enhanced-control channel, an enhanced-PDCCH (E-PDCCH) will be described below.

Control information included in the aforementioned DCI formats has been described in terms of a case in which the control information is transmitted through a PDCCH defined in LTE/LTE-A. However, the control information can be applied to another DL control channel, for example, an E-PDCCH instead of the PDCCH. The E-PDCCH may correspond to a new form of a control channel for carrying DCI such as scheduling allocation for the UE and may be introduced in order to effectively support a scheme such as inter-cell interference coordination (ICIC), CoMP, MU-MIMO, etc.

The E-PDCCH is differentiated from a legacy PDCCH in that the E-PDCCH is allocated to a time-frequency resource region (e.g., the data region of FIG. 3) except for a region (e.g., the control region of FIG. 3) defined for PDCCH transmission in a legacy LTE/LTE-A system (hereinafter, referred to as a legacy-PDCCH in order to differentiate the legacy PDCCH from the E-PDCCH)). For example, mapping of resource elements of the E-PDCCH may be expressed as mapping the resource elements to OFDM symbols except for first N (e.g., N≤4) of a DL subframe in the time domain and mapping the resource elements to a set of semi-statically allocated resource blocks (RBs) in the frequency domain.

For a similar reason to the introduction of the E-PDCCH, an E-PHICH may be defined as a new control channel for carrying HARQ ACK/NACK information for UL transmission and an E-PCFICH may be defined as a new control channel for carrying information for a resource region used for DL control channel transmission. The E-PDCCH, the E-PHICH, and/or the E-PCFICH will be collectively referred to as an enhanced-control channel.

An enhanced REG may be used to define mapping to resource elements of enhanced-control channels. For example, for one physical resource block (PRB) pair, 16 EREGs (that is, EREG 0 to EREG 15) may be present. On one PRB, remaining REs except for REs to which demodulation reference signals (DMRSs) are mapped are denoted by numerals 0 to 15. An order in which the numerals are denoted is determined by an order in which frequency increases and then is determined by an order in which time increases. For example, REs denoted by a numeral i constitute one EREG i.

The enhanced-control channel may be transmitted using aggregation of one or a plurality of enhanced CCEs (EC-CEs). Each ECCE may include one or a plurality of EREGs. The number of EREGs per ECCE may be, for example, 4 or 8 (4 in the case of a general subframe of a normal CP).

Available ECCEs for the enhanced-control channel may be denoted by 0 to $N_{ECCE}-1$. $N_{ECCE}$ may be, for example, 1, 2, 4, 8, 16, or 32.

The number of REs of the PRB pair configured for transmission of the enhanced-control channel may be defined to satisfy the following conditions i), ii), and iii): i) the REs are contained in one of 16 EREGs of a PRB pair; ii) the REs are not used for a cell-specific reference signal (CRS) or a channel state information-reference signal (CSI-RS); and iii) the enhanced-control channel belongs to an OFDM symbol with an index that is equal to or greater than an OFDM in which a control channel is started.

In addition, the enhanced-control channel may be mapped to REs using a localized scheme or a distributed method. The enhanced-control channel may be mapped to REs that satisfy the following conditions a) to d): a) the REs are contained in an EREG allocated for transmission; b) the REs are not contained in a PRB pair used for transmission of a physical broadcast channel (PBCH) or a synchronization signal; c) the REs are not used for a CRS or a CSI-RS for a specific UE; and d) the enhanced-control channel belongs to an OFDM symbol with an index that is equal to or greater than an OFDM in which a control channel is started.

Allocation of the enhanced-control channel may be performed as follows. One or a plurality of enhanced-control channel-PRB-set may be configured for the UE via higher layer signaling from an eNB. For example, in the case of the E-PDCCH, the enhanced-control channel-PRB-set may be for monitoring of the E-PDCCH.

In addition, cross interleaving may or may not be applied to RE mapping of the enhanced-control channel.

When the cross interleaving is not applied, one enhanced-control channel may be mapped to a specific set of a resource block, and the number of resource blocks included in the set of the resource block may correspond to an aggregation level 1, 2, 4, or 8. In addition, another enhanced-control channel may not be transmitted in a corresponding resource block set.

When the cross interleaving is applied, a plurality of enhanced-control channels may be multiplexed and interleaved together and mapped to a resource block allocated for enhanced-control channel transmission. That is, it may also be expressed by mapping a plurality of enhanced-control channels together on a specific resource block set.

UL Subframe Structure

Figure 4:
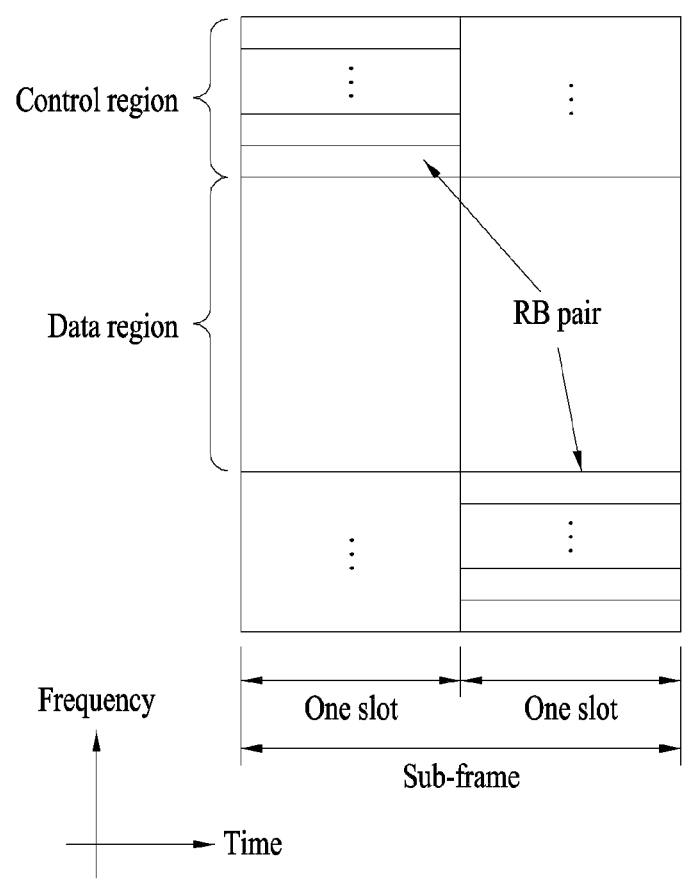
FIG. 4 is a diagram illustrating a structure of a uplink (UL) subframe.

FIG. 4 illustrates a structure of a UL subframe. A UL subframe may be divided into a control region and a data region in the frequency domain. The control region includes a PUCCH that carriers UL control information. The data region includes a PUSCH that carrier user data. In order to maintain single carrier wave properties, one UE may not simultaneously transmit a PUCCH and a PUSCH. An RB pair is allocated to a PUCCH of one UE in a subframe. RBs included in an RB pair occupy different subcarriers in two respective slots. The RB pair allocated to the PUCCH frequency-hops over a slot boundary.

Reference Signal (RS)

In a mobile communication system, a packet is transmitted on a radio channel from a transmitter to a receiver. In view of the nature of the radio channel, the packet may be distorted during the transmission. To receive the signal successfully, the receiver should compensate for the distortion in the received signal using channel information. Generally, to enable the receiver to acquire the channel information, the transmitter transmits a signal known to both the transmitter and the receiver and the receiver acquires knowledge of channel information based on the distortion of the signal received on the radio channel. The signal known to both the transmitter and receiver is referred to as a pilot signal or a reference signal (RS).

In transmission and reception of data using multiple antennas, the receiver needs to know channel states between transmit antennas and receive antennas. Accordingly, a separate reference signal is needed for each transmit antenna.

A DL RS includes a common reference signal (CRS) shared by all UEs in a cell and a dedicated reference signal (DRS) for a specific UE only. Information for channel estimation and demodulation can be provided according to the RSs. The CRS is an RS that can be commonly received by all UEs in a cell and distributed over all bands. The CRS can be used for CSI acquisition and data demodulation.

A receiver (UE) may estimate a channel state from the CRS and feedback an indicator associated with channel quality, such as a channel quality indicator (CQI), a precoding matrix index (PMI), and/or a rank indicator (RI) to a transmitter (eNB). The CRS can also be called a cell-specific RS.

The DRS can be transmitted through a corresponding RE when demodulation of data on a PDSCH is needed. The UE may receive information about presence or absence of a DRS from a higher layer and receive information representing that the DRS is valid only when a corresponding PDSCH is mapped. The DRS may also be called a UE-specific reference signal or modulation reference signal (DMRS). The DRS (or UE-specific reference signal) is used for data demodulation. A precoding weight used for a specific UE is used for the DRS during multi-antenna transmission such that an equivalent channel corresponding a combination of a precoding weight transmitted through each transmit antenna and a transmission channel can be estimated when the UE receives the DRS.

Figure 5:
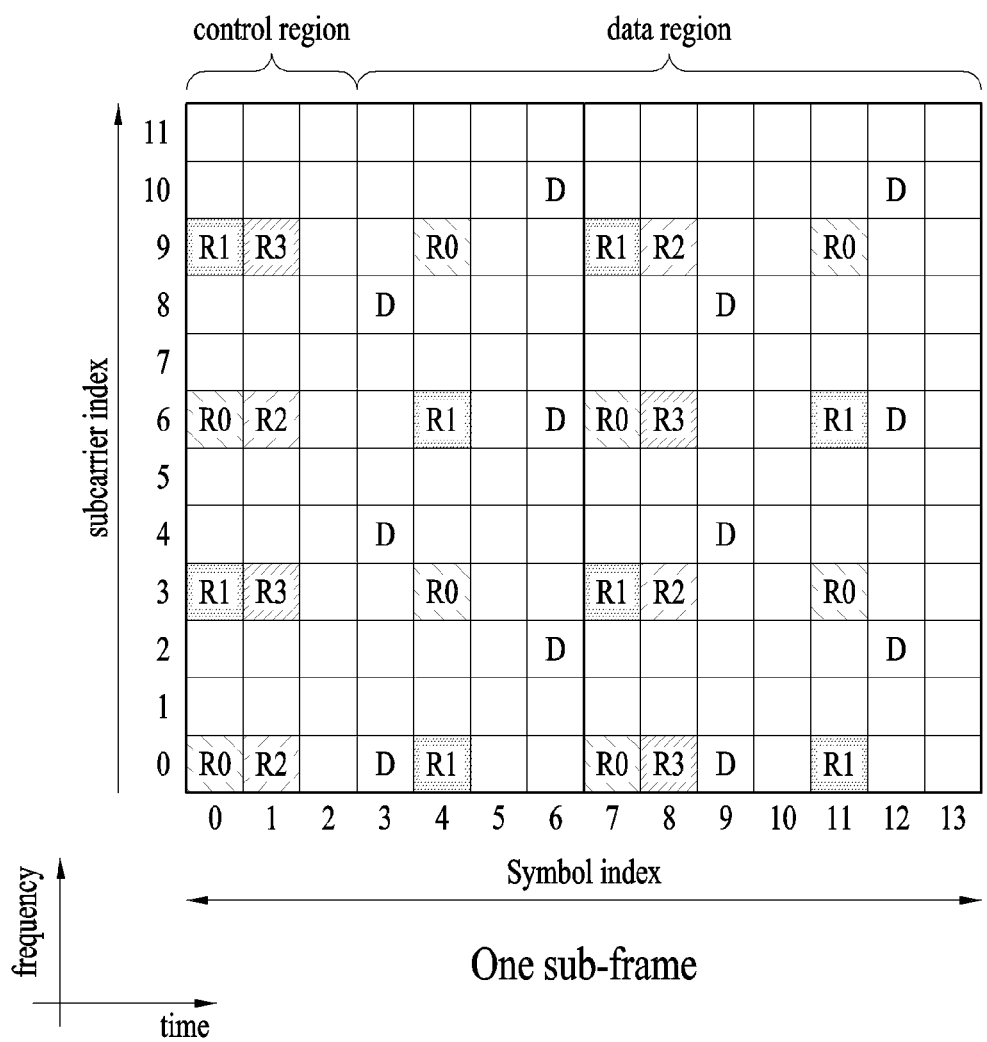
FIG. 5 is a diagram for explanation of a DL reference signal.

FIG. 5 illustrates a pattern of matching a CRS and a DRS defined in a 3GPP LTE system (e.g. release-8) to a downlink RB pair. A downlink RB pair as a unit to which a reference signal is mapped can be represented by a product of one subframe in the time domain and 12 subcarriers in the frequency domain. That is, one RB pair has a length corresponding to 14 OFDM symbols in case of normal CP and a length corresponding to 12 OFDM symbols in case of extended CP. FIG. 5 shows an RB pair in case of normal CP.

FIG. 5 shows positions of reference signals on an RB pair in a system in which an eNB supports four transmit antennas. In FIG. 5, REs denoted by 'R0', 'R1', 'R2' and 'R3' correspond to CRS positions for antenna port indexes 0, 1, 2 and 3. In FIG. 5, REs denoted by 'D' correspond to DRS positions.

High-order multiple input multiple output (MIMO), multi-cell transmission, enhanced multi-user (MU)-MIMO, etc. are considered in LTE-A evolved from 3GPP LTE. To efficiently operate reference signals and support enhanced transmission schemes, DRS based data demodulation is being considered. That is, a DRS (or UE-specific reference signal or DMRS) for two or more layers can be defined to support data transmission through an additional antenna, separately from a DRS (corresponding to antenna port index 5) for rank 1 beamforming defined in 3GPP LTE (e.g. release-8). For example, UE-specific reference signal ports supporting up to 8 transmit antenna ports can be defined as antenna port numbers 7 to 12 and can be transmitted in REs which do not overlap with other reference signals.

Furthermore, LTE-A may separately define an RS related to feedback of channel state information (CSI) such as CQI/PMI/RI for a new antenna port as a CSI-RS. For example, CSI-RS ports supporting up to 8 transmit antenna ports can be defined as antenna port numbers 15 to 22 and can be transmitted in REs which do not overlap with other reference signals.

Coordinated Multi-Point (CoMP)

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs. That is, the scheduler can directly direct collaborative MIMO operation to each eNB.

As described above, the CoMP system can be regarded as a virtual MIMO system using a group of a plurality of cells. Basically, a communication scheme of MIMO using multiple antennas can be applied to CoMP.

Determination of Transmission Resource of ACK/NACK Information

The ACK/NACK information is control information that is fed back to a transmitter from a receiver according to whether decoding of data transmitted from the transmitter is successful. For example, when decoding of DL data of a UE is successful, the UE may feedback ACK information to an eNB and otherwise feedback NACK information to the eNB. In detail, in an LTE system, there may be three cases in which the receiver needs to transmit ACK/NACK, which will be described below.

First, ACK/NACK is transmitted in response to transmission of a PDSCH indicated by detection of a PDCCH. Second, ACK/NACK is transmitted in response to a PDCCH indicating release of semi-persistent scheduling (SPS). Third, ACK/NACK is transmitted in response to a PDSCH transmitted without detection of a PDCCH, which refers to ACK/NACK to transmission of an SPS PDSCH. Hereinafter, unless specifically described, the ACK/NACK transmission scheme is not limited to any one of the aforementioned three cases.

Hereinafter, transmission resources of ACK/NACK information in an FDD scheme and a TDD scheme will be described in detail.

The FDD scheme is a scheme of separating DL and UL for each respective independent frequency band and performing transmission and reception. Accordingly, when an eNB transmits a PDSCH in a DL band, a UE may transmit ACK/NACK response indicating whether DL data reception is successful via a PUCCH on a UL band corresponding to the DL band after a specific period of time. Accordingly, the UE may operate with DL and UL having one to one correspondence.

In detail, in an example of a legacy 3GPP LTE system, control information about DL data transmission of the eNB may be transmitted to the UE through a PDCCH, and the UE that receives data, which is scheduled to the UE through the PDCCH, through a PDSCH may transmit ACK/NACK through a PUCCH as a channel for transmission of UL control information (or in a piggyback manner on a PUSCH). In general, a PUCCH for transmission of ACK/NACK is not pre-allocated to each UE but instead a plurality of UEs in a cell uses a plurality of PUCCHs separated for respective points of time. Accordingly, as a PUCCH resource in which a UE that receives DL data at a random point of time, a PUCCH resource corresponding to a PDCCH in which the UE receives scheduling information of the corresponding DL data may be used.

The PUCCH resource corresponding to the PDCCH will be described in more detail. A region in which a PDCCH of each DL subframe is transmitted includes a plurality of control channel elements (CCEs), and a PDCCH transmitted to one UE in a random subframe includes one or a plurality of CCEs among CCEs constituting a PDCCH region of the subframe. In addition, in a region in which a PUCCH of each UL subframe is transmitted, resources for transmission of a plurality of PUCCHs are present. In this case, the UE may transmit ACK/NACK through a PUCCH with an index corresponding to an index of a specific CCE (e.g., a first or lowest CCE) among CCEs constituting a PDCCH received by the UE.

For example, it may be assumed that information on a PDSCH is delivered on a PDCCH composed of CCEs #4, #5 and #6. In this case, a UE transmits an ACK/NACK signal on PUCCH #4 corresponding to CCE #4, the first (or the lowest) CCE of the PDCCH that schedules the PDSCH.

In an FDD system, the UE may transmit HARQ ACK/NACK information in a subframe index n in response to transmission of a PDSCH received in a subframe index (n−k) (e.g., k=4 in an LTE system). Based on a PDCCH indicating transmission of a PDSCH in a subframe (n−k), the UE may determine a PUCCH resource index for transmission of HARQ ACK/NACK in a subframe n.

For example, a PUCCH resource index in an LTE system is determined as follows.

$$n^{(1)}_{PUCCH} = n_{CCE} + N^{(1)}_{PUCCH} \quad \text{[Equation 1]}$$

In Equation 1 above, $n^{(1)}_{PUCCH}$ represents a resource index of PUCCH format 1 for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift, an orthogonal spreading code and a physical resource block (PRB) for PUCCH formats 1a/1b are obtained from $n^{(1)}_{PUCCH}$.

Hereinafter, ACK/NACK in a TDD mode will be described.

In the TDD mode, DL transmission and UL transmission are discriminated according to time, such that subframes contained in a frame may be classified into DL subframes and UL subframes. Table 3 below an exemplary UL-DL configuration in a TDD mode.

TABLE 3

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 3, D is a DL subframe, U is a UL subframe, and S is a special subframe. The special subframe denoted by S may include three fields, i.e., downlink pilot timeslot (DwPTS), guard period (GP), and uplink pilot timeslot (UpPTS). DwPTS is a time period reserved for DL transmission, and UpPTS is a time period reserved for UL transmission.

In a TDD system, a UE may transmit ACK/NACK information as a response to PDSCH transmission in one or more DL subframe in one UL subframe. The UE may transmit HACK ACK/NACK information in a UL subframe n as a response to transmission of PDSCH received in a DL subframe (n−k). k may be given according to the UL-DL configuration. For example, k may be given as a DL related set index K: $\{k_0, k_1, \ldots, k_{M-1}\}$ according to the UL-DL of Table 3 as shown in Table 4 below.

TABLE 4

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, in Table 4 above, since k=4 is given in a UL subframe 9 in the case of UL-DL configuration 0, ACK/NACK information about data received in a DL subframe 5 (=9−4) may be transmitted in the UL subframe 9. Hereinafter, a method of determining a PUCCH resource index for transmission of ACK/NACK in a TDD system will be described in detail.

In Table 4 above, the number of elements $\{k_0, k_1, \ldots, k_{M-1}\}$ of a set K is referred to as M. For example, in the case of UL-DL configuration 0, the number of elements of the set K for a subframe 2 is 1, and in the case of UL-DL configuration 2, the number of elements of the set K for the subframe 2 is 4.

For TDD ACK/NACK bundling or TDD ACK/NACK multiplexing in a subframe n with M=1, the UE may determine a PUCCH resource $n^{(1)}_{PUCCH}$ for HARQ ACK/NACK transmission in a subframe n as follows.

When a PDCCH indicating SPS release or PDSCH transmission indicated by a PDCCH is present in a subframe (n−k) (k∈K), the UE selects p from {0, 1, 2, 3} to satisfy $N_p \leq n_{CCE} < N_{p+1}$. A PUCCH resource index $n^{(1)}_{PUCCH}$ may be determined according to Equation 2 below.

$$n_{PUCCH}^{(1)} = (M-m-1) \times N_p + m \times N_{p+1} + n_{CCE} + N_{PUCCH}^{(1)} \quad \text{[Equation 2]}$$

In Equation 2 above, $n^{(1)}_{PUCCH}$ is a resource index of PUCCH format 1 for transmission of ACK/NACK, $N^{(1)}_{PUCCH}$ is a signaling value transmitted from a higher layer, and $n_{CCE}$ is a smallest value among CCE indexes used for PDCCH transmission in a subframe (n−$k_m$) (here, $k_m$ is a smallest value in a set K). $N_p$ may be determined according to Equation 3 below.

$$N_p = \max\{0, \lfloor [N_{RB}^{DL} \times (N_{SC}^{RB} \times p - 4)]/36 \rfloor\} \quad \text{[Equation 3]}$$

In Equation 3 above, $N_{RB}^{DL}$ refers to DL bandwidth configuration and is represented in a unit of $N_{SC}^{RB}$. $N_{SC}^{RB}$ is a size of a resource block in the frequency domain and is represented by the number of subcarriers.

When PDSCH transmission is present in a subframe (n−k) (k∈K) without a PDCCH, $n^{(1)}_{PUCCH}$ may be determined according to higher layer configuration.

For TDD ACK/NACK multiplexing in a subframe n with M>1, the UE may determine a PUCCH resource for HARQ ACK/NACK transmission as follows. Hereinafter, $n^{(1)}_{PUCCH,i}$ (0≤i≤M−1) is referred to as an ACK/NACK resource derived from a subframe (n−$k_i$) and HARQ-ACK(i) is referred to as ACK/NACK response from a subframe (n−$k_i$).

When a PDCCH indicating SPS release or PDSCH transmission indicated by a PDCCH is present in a subframe (n−$k_i$) ($k_i$∈K), an ACK/NACK resource $n^{(1)}_{PUCCH,i}$ may be determined according to Equation 4 below.

$$n_{PUCCH,i}^{(1)} = (M-i-1) \times N_p + i \times N_{p+1} + n_{CCE,i} + N_{PUCCH}^{(1)} \quad \text{[Equation 4]}$$

In Equation 4, $N^{(1)}_{PUCCH}$ is a signaling value transmitted from a higher layer. $n_{CCE,i}$ is a smallest value among CCE indexes used for PDCCH transmission in a subframe (n−$k_i$). p is selected from {0, 1, 2, 3} to satisfy $N_p \leq n_{CCE,i} < N_{p+1}$. Np may be determined according to Equation 3 above.

When PDSCH transmission is present in a subframe (n−$k_i$) ($k_i$∈K) without a PDCCH, $n^{(1)}_{PUCCH,i}$ may be determined according to higher layer configuration.

The UE transmits bits b(0), b(1) on an ACK/NACK resource $n^{(1)}_{PUCCH}$ in a subframe n using PUCCH format 1b. b(0), b(1) and an ACK/NACK resource $n^{(1)}_{PUCCH}$ may be generated by channel selection according to Tables 5, 6, and 7 below. Tables 5, 6, and 7 show ACK/NACK multiplexing in the cases of M=2, M=3, and M=4, respectively. When b(0)b(1) is mapped to N/A, the UE may not transmit ACK/NACK response in a subframe n.

TABLE 5

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

TABLE 6

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | N/A | N/A |

TABLE 7

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Tables 5, 6, and 7 above, HARQ-ACK(i) indicates the HARQ ACK/NACK/DTX result of an i-th data unit (0≤i≤3). Discontinuous transmission (DTX) represents that there is no transmission of a data unit corresponding to HARQ-ACK (i) or the UE does not detect the data unit corresponding to HARQ-ACK(i). Throughout this specification, HARQ-ACK is interchangeably used. Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Tables 5, 6, and 7 above, $n^{(1)}_{PUCCH,X}$ represents a PUCCH resource actually used for ACK/NACK transmission, and b(0)b(1) indicates two bits transmitted through the selected PUCCH resource, which are modulated using QPSK. For example, as shown in Table 7 above, when the UE has decoded 4 data units successfully, the UE transits bits (1, 1) to a BS through a PUCCH resource linked with $n^{(1)}_{PUCCH,1}$. Since combinations of PUCCH resources and QPSK symbols cannot represent all available ACK/NACK suppositions, NACK and DTX are coupled except some cases (NACK/DTX, N/D).

Enhanced-Control Channel Based Operation

The present invention proposes a method using a scrambling sequence parameter and/or a plurality of antenna ports associated with an enhanced control channel (e.g., an E-PDCCH).

First, to aid in understanding of the present invention, a method of determining one or more PUCCH resources for transmission of ACK/NACK to DL data scheduled via the E-PDCCH using the scrambling sequence parameter and/or the plural antenna ports associated with an E-PDCCH will be described.

Method of Determining PUCCH Resource Associated with E-PDCCH

The UE may detect a control channel containing information (or DL scheduling information) about DL assignment and receive a PDSCH corresponding to the control channel. The UE may feedback information about whether PDSCH reception is successful after a predetermined period of time. In a 3GPP LTE system, a resource to be used for ACK/NACK transmission may be determined from a PDCCH in which the DL assignment is transmitted. As described above, the UE may recognize a first index (e.g., an index n) from CCEs of a PDCCH used for transmission of DL assignment and transmit ACK/NACK using a PUCCH resource corresponding to $n_{offset}^{PUCCH}+n$ obtained by adding the CCE index to $N_{offset}^{PUCCH}$ as offset indicating beginning of a PUCCH resource region used for ACK/NACK. Here, $N_{offset}^{PUCCH}$ may be a value signaled by a higher layer like $N^{(1)}_{PUCCH}$ Equation 1 above.

The method of determining a PUCCH resource based on a CCE index of a PDCCH can be applied to the legacy-PDCCH in which one CCE is used for only one UE without any problem, but it can be difficult to apply the method to an enhanced PDCCH (i.e., an E-PDCCH). Unlike the legacy-PDCCH, the E-PDCCH can be demodulated based on a UE-specific RS (or DMRS) and can apply MU-MIMO. Accordingly, when a PUCCH resource is determined using a conventional method, ACK/NACK resource collision may occur. For example, when MU-MIMO is applied to the E-PDCCH, two or more UEs can receive DL assignment divided according to precoding (or UE-specific RS (or DMRS)) while sharing the same time/frequency resource (i.e., CCE or ECCE, and hereinafter, referred to as (E)CCE). In this case, when the conventional PUCCH resource determination method is still used, a plurality of UEs (i.e., UEs belonging to one E-PDCCH MU-MIMO group) using the same (E)CCE can simultaneously transmit ACK/NACK signals using the same PUCCH resource (i.e., ACK/NACK resource collision).

To address this issue, according to the present invention, when DL assignment is received using an E-PDCCH, a plurality of PUCCH resources for one DL assignment is reserved as ACK/NACK resources, and an individual UE selects some of the plural reserved PUCCH resources and performs ACK/NACK feedback.

For example, when DL assignment is received using an aggregation level L (i.e., using (E)CCE $n_0, n_1, \ldots, n_{(L-1)}$), a UE may select one of the L PUCCH resources linked with the L (E)CCEs and feedback ACK/NACK.

In this case, a PUCCH resource to be used by each UE may be determined based on a parameter k (k= 0, 1, 2, 3, . . . ). A value of the parameter k may be indicated using a specific field in DL assignment or selected from the feature of an RS (UE-specific RS or DMRS) used for detection (or demodulation) of DL assignment.

For example, when the specific field in DL assignment indicates k, a PUCCH resource linked with (E)CCE having an index corresponding to k can be selected.

Hereinafter, an example in which a PUCCH resource is selected from the feature of an RS associated with an E-PDCCH will be described in detail.

For example, when an antenna port number of a UE-specific RS (or DMRS) used for demodulation of a PDCCH for carrying DL assignment is p (e.g., p ∈ {7, 8, 9, 10} or p∈{107, 108, 109, 110}), a PUCCH resource linked with (E)CCE $n_k$ may be selected. Here, a relationship between k and p may be given by k=(p−7) mod L (p∈{7, 8, 9, 10}) or k=(p−107) mod L (p∈{107, 108, 109, 110})). Here, k is an (E)CCE index number, p is an antenna port number, and L is an aggregation level. In addition, mod refers to modulo calculation and X mod Y refers to a remainder obtained by dividing X by Y. For example, with regard to L=2, when an antenna port number 7 or 9 (or an antenna port number 107 or 109) is used, a PUCCH resource linked with (E)CCE no may be selected, and when an antenna port number 8 or 10 (or antenna port number 108 or 110) is used, a PUCCH resource linked with (E)CCE n1 may be selected.

An (E)CCE index may be selected using a scramble sequence initialization value of a UE-specific RS (or DMRS) used for demodulation of a PDCCH for carrying DL assignment and an ACK/NACK resource linked with the selected (E)CCE index. The scramble sequence initialization value may be referred to as a scrambling identifier (SCID).

For example, according to a combination of an antenna port number and an SCID, a resource to be used as ACK/NACK feedback may be determined. For example, the form such as k=((p−7)+(SCID)) mod L or k=((p−107)+(SCID)) mod L may be given.

As described above, according to a method for determining an ACK/NACK resource using a scrambling sequence parameter and/or a plurality of antenna ports associated with an E-PDCCH, in order to determine PUCCH that does not collide with each UE that belongs to the same E-PDCCH MU-MIMO group, an eNB needs to be appropriately configure an E-PDCCH aggregation level, an (E)CCE index number, an antenna port of an RS (UE-specific RS or DMRS), and/or a scrambling sequence and to transmit an E-PDCCH for each UE.

Here, the above proposed operation can be smoothly performed when one DL assignment has a plurality of (E)CCEs, the operation may be limited to only a case of two or more aggregation levels. This means that two or more aggregation levels need to be used in order to transmit DL assignment using MU-MIMO by an eNB.

For another example, when DL assignment is received using an aggregation level L (i.e., using (E)CCE $n_0, n_1, \ldots, n_{(L-1)}$), the UE may determine a specific (E)CCE index n* (e.g., (E)CCE $n_0$ with a lowest index or (E)CCE index derived from a UE ID, etc.) among the L (E)CCEs, select a PUCCH resource (e.g., $n*+k+N_{offset}^{PUCCH}$) linked with an (E)CCE index n*+k obtained by applying predetermined offset (e.g., k) to the specific (E)CCE index (which means an index corresponding to a representative AP of an E-PDCCH according to one-to-one correspondence), and feedback ACK/NACK.

Here, a parameter k corresponding to offset may be indicated using a specific field of a DCI format of DL assignment like in the aforementioned example or determined by a scramble sequence initialization value (e.g., SCID) and/or an antenna port of an RS used for demodulation of DL assignment. A DCI format of DL assignment may refer to, for example, a DCI format 1A, 1B, 1D, 1, 2A, 2, 2B, 2C, 2D, etc.

For example, when a UE can use a PUCCH resources linked with (E)CCEs except for an aggregated (E)CCE, the offset k may be determined in the form of k=(p−7) or k=((p−7)+(SCID)) (in this case, it is assumed that the UE uses an antenna port p and p ∈ {7, 8, 9, 10}). This method may be useful for transmission of MU-MIMO E-PDCCH particularly when an aggregation level is 1 (i.e., when only one (E)CCE is used).

k may be determined as follows. For example, it is assumed that the UE may use a PUCCH resource linked with an (E)CCE positioned before no corresponding to a first (or lowest) (E)CCE index used in corresponding DL assignment on an (E)CCE index. In this case, the UE may use a PUCCH resource $N_{offset}^{PUCCH}+n_0+k$ and $k=(7-p)$ may be given. For example, in the case of an antenna port 7, a PUCCH resource $N_{offset}^{PUCCH}+n_0$ may be used, and in the case of an antenna port 8, a PUCCH resource $N_{offset}^{PUCCH}+n_0-1$ may be used.

For another example, an ACK/NACK PUCCH resource region is divided into K regions, a start point of each region $k(=0, 1, \ldots, K-1)$ is indicated to the UE in the form of $N_{offset}^{PUCCH}(k)$, and then the UE may determine a specific (E)CCE index n* (e.g., (E)CCE $n_0$ with a lowest index or an (E)CCE index derived from a UE ID, etc.) associated with transmission of DL assignment, select an appropriate PUCCH resource region k, and use a PUCCH resource $N_{offset}^{PUCCH}(k)+n*$.

Here, a parameter k corresponding to an index of a PUCCH region may be indicated using a specific field of a DCI format of DL assignment like in the aforementioned example or determined by a scramble sequence initialization value (e.g., SCID) and/or an antenna port of an RS used for demodulation of DL assignment.

For another example, a plurality of PUCCH resources may be linked with one (E)CCE. When one (E)CCE is linked with K PUCCH resources, the UE may determine a specific (E)CCE index n* (e.g., (E)CCE no with a lowest index or an (E)CCE index derived from a UE ID, etc.) associated with transmission of DL assignment, select an appropriate k, and use a PUCCH resource $N_{offset}^{PUCCH}+Kn*+k$.

Here, a parameter k associated with determination of a PUCCH resource index may be indicated using a specific field of a DCI format of assignment like in the aforementioned example or may be determined by a scramble sequence initialization value (e.g., SCID) and/or an antenna port of an RS used for demodulation of DL assignment.

In the aforementioned examples, a PUCCH resource region may be classified (divided) into a region used when a legacy-PDCCH receives DL assignment and a region used when an E-PDCCH receives DL assignment. In particular, the classification (or division) is effective to prevent ACK/NACK resource collision of a legacy-PDCCH and a PDSCH scheduled by an E-PDCCH. In this case, an eNB needs to divide an offset value $N_{offset}^{PUCCH}$ indicating a start point of each PUCCH resource region into values for the legacy-PDCCH and the E-PDCCH and to indicate the values.

The methods according to the present invention can be restrictedly applied to a specific E-PDCCH search space (e.g., a UE-specific search space). This is because DCI that is simultaneously received by many UEs is generally transmitted in a common search space, and thus, the necessity of using MU-MIMO is low.

The methods according to the present invention can be restrictedly applied only to E-PDCCH transmission of a specific transmission mode appropriate for application of MU-MIMO. For example, in order to achieve diversity in a frequency domain or a space domain similarly to a legacy PDCCH, an E-PDCCH may be divided into a plurality of REGs, and an interleaved E-PDCCH transmission mode (e.g., a distributed type E-PDCCH transmission) for interleaving the REGs can be defined, or a non-interleaved E-PDCCH transmission mode (e.g., a localized type E-PDCCH transmission) in which one E-PDCCH (E)CCE is transmitted only in one frequency domain unit (e.g., a PRB pair) or one space domain unit can be defined. In this regard, the aforementioned method of determining a PUCCH resource using the scrambling sequence parameter and/or the antenna port associated with the E-PDCCH may not be applied in the interleaved E-PDCCH transmission mode in which it is difficult to apply MU-MIMO and may be applied only to a non-interleaving transmission mode in which application of MU-MIMO is appropriate.

The methods according to the present invention can be restrictedly applied to a specific aggregation level. For example, an E-PDCCH using many (E)CCEs like in the case of an aggregation level 4 or 8 is generally used when a channel status is poor, and thus, it may not be appropriate to apply MU-MIMO. Accordingly, the aforementioned method of determining a PUCCH resource using the scrambling sequence parameter and/or the antenna port associated with the E-PDCCH may restrictedly applied to a low aggregation level such as an aggregation level 1 or 2.

Likewise, in order to appropriately select a method of determining an ACK/NACK PUCCH resource according to a condition, the eNB may notify the UE of how an ACK/NACK feedback resource is used for each respective search space or subframe via a higher layer signal such as an RRC. In addition, when a plurality of PUCCH resource regions is used or a plurality of PUCCH resources is linked with one (E)CCE, the eNB may notify the UE of information about the number of the PUCCH resource regions or information about the number of the PUCCH resources linked with one (E)CCE via a higher layer signal such as a RRC.

In addition, as another method for preventing the aforementioned ACK/NACK resource collision, separate PUCCH resources other than a PUCCH resource linked with (E)CCE may be reserved using a higher layer signal such as an RRC, and an appropriate resource may be selected among separate PUCCH resources. For example, a UE that decodes DL assignment may recognize one PUCCH resource linked with (E)CCE, also recognize some PUCCH resources pre-transmitted via an RRC, and then determine a final PUCCH resource to be used for ACK/NACK transmission via appropriate indication. Here, indication for determination of a resource used for actual transmission among the PUCCH resources recognized by the UE may be determined using a specific field in DL assignment or determined from a scramble sequence initialization value (e.g., SCID) and/or an antenna port of an RS used for detection (or demodulation) of DL assignment.

For example, it is assumed that the UE recognizes one PUCCH resource (e.g., a PUCCH resource $n_1$) linked with (E)CCE used for transmission of DL assignment and recognizes three PUCCH resources (e.g., PUCCH resources $n_2$, $n_3$, and $n_4$) pre-configured via an RRC.

In this case, when a specific field value in DL assignment is given by one of 00, 01, 10, and 11, one of PUCCH resources n1, n2, n3, and n4 may be determined In addition, when an RS associated with an E-PDCCH is one of antenna port numbers 7, 8, 9, and 10 (or 107, 108, 109, and 110), one of the PUCCH resources n1, n2, n3, and n4 may be determined In the aforementioned examples, to aid in understanding of principle of the present invention, the case in which the UE performs ACK/NACK feedback using one PUCCH resource has been described, but the scope of the present invention is not limited thereto. For example, when a UE for supporting transmission of multi-antenna port uses a plurality of PUCCH resources in order to obtain transmit diversity, etc., a PUCCH resource may also be appropriately determined in order to prevent PUCCH resource collision according to the aforementioned principle of the present invention.

For example, when one UE uses two PUCCH resources, a first PUCCH resource may be determined as n* and a second PUCCH resource may be determined as n*+1 according to the aforementioned method.

Hereinafter, examples in which one UE transmits ACK/NACK using a plurality of PUCCH resources in order to obtain transmit diversity will be described in detail.

In the following examples, it may be assumed that the UE detects (or demodulates) an E-PDCCH using one antenna port of an RS and a plurality of PUCCH resources to be used for transmit diversity may be indicted by one antenna port.

Like in the example in which the UE detects a plurality of (E)CCEs of an E-PDCCH using different antenna ports, when the E-PDCCH is detected using the plural antenna ports, the UE may determine a PUCCH resource using one representative antenna port (or a virtual antenna port). The representative antenna port may be determined as an antenna port with a minimum index among the used antenna ports or determined as the antenna port used to detect a representative (E)CCE (e.g., (E)CCE with a minimum index).

For example, when DL assignment is received using an aggregation level L (i.e., (E)CCE $n_0, n_1, \ldots, n_{(L-1)}$), a UE may select M resources among the L PUCCH resources linked with the L (E)CCEs and feedback ACK/NACK.

When an antenna port number of a UE-specific RS (or DMRS) used for demodulation of a PDCCH for carrying DL assignment is p (e.g., p ∈{7, 8, 9, 10} or p∈{107, 108, 109, 110}), a PUCCH resource linked with two (E)CCEs $n_k$ and $n_{(k+1)}$ may be selected. Here, a relationship between k and p may be given in the form of k=(p−7)*M mod L or may be given by k=(p−107)*M mod L.

When M=2 and L=4 are given, if an antenna port associated with detection of E-PDCCH is 7 or 9 (or if the antenna port is 107 or 109), the UE may select PUCCH resources $n_0$ and $n_1$, and if the antenna port is 8 or 10 (or if the antenna port is 108 or 110), the UE may select PUCCH resources $n_2$ and $n_3$.

When PUCCH resources linked with (E)CCEs that do not belong to the same E-PDCCH can be used, k=(p−7)*M (or k=(p−107)*M) may be determined, and if k<L−1, $n_k=n_{(L-1)}+k-L+1$ may be determined.

In the aforementioned examples, the case in which k is determined based on an antenna port number has been described. However, k may be determined based on a scramble sequence initialization value (e.g., SCID) of an RS associated with an E-PDCCH.

For another example, an ACK/NACK PUCCH resource region is divided into K regions, a start point of each region k(=0, 1, . . . , K−1) is indicated to the UE in the form of $N_{offset}^{PUCCH}(k)$, and then the UE may determine a specific (E)CCE index n* (e.g., (E)CCE no with a lowest index or an (E)CCE index derived from a UE ID, etc.) associated with transmission of DL assignment and use M appropriate PUCCH resources $N_{offset}^{PUCCH}(k)+n^*, N_{offset}^{PUCCH}(k+1)+n^*, \ldots, N_{offset}^{PUCCH}(k+M-1)+n^*$. Here, as an example of determination of k, k may be given in the form of k=(p−7)*M (or k=(p−107)*M). In addition, K that is the number of PUCCH resource regions may be associated with an ACK/NACK transmission method in a PUCCH. For example, when a PUCCH transmission diversity mode with M=2 is set, since doubled PUCCH resources are required compared with M=1 in general, K may be set to be twice as high as in the case of M=1. Accordingly, the UE may change the number of regions obtained by dividing ACK/NACK PUCCH resource regions based on an ACK/NACK transmission method in a PUCCH resource.

In addition, a plurality of PUCCH resources may be linked with one (E)CCE. When one (E)CCE uses K PUCCH resources, the UE may determine a specific (E)CCE index n* (e.g., (E)CCE no with a lowest index or (E)CCE index derived from a UE ID, etc.) associated with transmission of DL assignment and use M PUCCH resources $N_{offset}^{PUCCH}+Kn^*+k, N_{offset}^{PUCCH}+Kn^*+k+1, \ldots, N_{offset}^{PUCCH}+Kn^*+k+M-1$. Here, as an example of determination of k, k may be given in the form of k=(p−7)*M (or k=(p−107)*M). In addition, K that is the number of PUCCH resource regions may be associated with an ACK/NACK transmission method in a PUCCH. For example, when a PUCCH transmission diversity mode with M=2 is set, since doubled PUCCH resources are required compared with M=1 in general, K may be set to be twice as high as in the case of M=1.

Like in the aforementioned examples, when ACK/NACK transmission is performed using a plurality of PUCCH resources, the number of UEs that simultaneously belong to one MU-MIMO group in one E-PDCCH resource may be limited.

For example, it may be assumed that four PUCCH resources $m_0, m_1, m_2$, and $m_3$ are allocated to one E-PDCCH resource. In detail, a single E-PDCCH resource includes four (E)CCEs and one PUCCH resource is linked with each respective (E)CCE, or a single E-PDCCH resource includes two (E)CCEs and two PUCCH resources are linked with each (E)CCE. In this case, the present invention may be limited to a case in which MU-MIMO is performed on up to two UEs that perform transmit diversity using two PUCCH resources. Here, in the case of a UE to which PUCCH transmit diversity is applied, when an antenna port 7 (or 107) is used in relation to an E-PDCCH, PUCCH resources $m_0$ and $m_1$ may be used, and when an antenna port 8 (or 108) is used in relation to an E-PDCCH, PUCCH resources $m_2$ and $m_3$ may be used. MU-MIMO may be performed on up to four UEs to which PUCCH transmit diversity is applied. In this case, each UE may occupy one PUCCH resource. Here, in order to use the same PUCCH resource if possible in both cases in which PUCCH transmit diversity is applied and is not applied, a UE to which PUCCH transmission diversity is not applied may use PUCCH resources $m_0, m_2, m_1$, and $m_3$, respectively when the UE uses antenna ports 7, 8, 9, and 10 (or 107, 108, 109, and 110) in relation to an E-PDCCH.

Method of Determining Representative Antenna Port

Hereinafter, an E-PDCCH related operation using a representative antenna port (or a virtual antenna port) will be described with regard to embodiments of the present invention.

As described above, when one E-PDCCH is transmitted using a plurality of resource regions (e.g., (E)CCE), different antenna ports may be mapped to respective resource regions. In this case, one representative antenna port may be determined and the E-PDCCH related operation may be performed based on the representative antenna port.

The representative antenna port may be determined according to any one of the following methods.

Method 1—The representative antenna port may be determined to have a minimum index among antenna port(s) mapped to an E-PDCCH resource region. For example, when an antenna port 7 (or 107) is mapped in a resource region 1 and an antenna port 8 (or 108) is mapped in a resource region 2, the representative antenna port may be determined as the antenna port 7 (or 107) with respect to an E-PDCCH using both the two resource regions.

Method 2—The representative antenna port may be determined to have a maximum index among antenna port(s) mapped to an E-PDCCH resource region. For example, when an antenna port 7 (or 107) is mapped in a resource region 1 and an antenna port 8 (or 108) is mapped in a resource region 2, the representative antenna port may be determined as the antenna port 8 (or 108) with respect to an E-PDCCH using both the two resource regions.

The method 2 may be useful to prevent collision between an RS antenna port of an E-PDCCH of a cell and an RS antenna port of a PDSCH of an adjacent cell. For example, an RS that uses a PDSCH of an adjacent cell uses antenna ports, the number of which corresponds to the number of ranks from the antenna port 7 as a start antenna port, according to ranks of the antenna ports, and thus, an antenna port with a low index is used more frequently. Accordingly, according to the method 2, when the representative antenna port of the E-PDCCH is determined, since an antenna port with a high index is more frequently used as the representative antenna port of the E-PDCCH, a collisional frequency with the antenna port of the PDSCH of the adjacent cell can be reduced. In addition, the method 2 is particularly effective to E-PDCCH demodulation using the representative antenna port, which will be described below.

Method 3—Priority for selection of the representative antenna port may be pre-transmitted to the UE via a higher layer signal such as an RRC, and one of E-PDCCH related antenna port(s) may be selected according to the priority. For example, the eNB may determine priorities for antenna ports 7, 8, 9, and 10 (or antenna ports 107, 108, 109, and 110) and determine an antenna port with highest priority as the representative antenna port among a plurality of antenna ports when the plural antenna ports are mapped to one E-PDCCH. The method 3 is advantageous in that the eNB can adjust a method of determining a representative antenna port such that representative antenna ports between cells do not overlap with each other (i.e., different representative antenna ports are different).

Method 4—A method of determining a representative antenna port (or priority for selection of the representative antenna port) may be determined based on an (E)CCE index, an antenna port (AP) index, a UE ID, a cell ID, etc. For example, a hash function may be predefined based on parameters such as an (E)CCE index, an AP index, a UE ID, a cell ID, etc., a hash function value (i.e., a result value of the hash function) may be determined as the representative antenna port. Accordingly, without separate network signaling, different UEs may use different representative antenna ports to prevent RS collision and use a PUCCH region divided for the respective representative antenna ports without collision.

Method 5—An antenna port used to detect a representative resource region (e.g., one (E)CCE) may be determined as a representative antenna port among resource region(s) of the E-PDCCH. Here, the representative resource region may be a resource region with a minimum or maximum index among resources regions used for the E-PDCCH.

Method 6—When an antenna port used to detect a representative resource region is determined as a representative antenna port among resource region(s) of the E-PDCCH, the representative resource region may be determined as a resource region with a minimum resource region index. Here, the minimum resource region index may be a minimum value among indexes present when the resource regions included in the corresponding E-PDCCH are determined (i.e., during an aggregation procedure), but not a minimum value of indexes that are finally determined for resource regions included in the corresponding E-PDCCH. That is, a resource region in which aggregation begins may be determined as the representative antenna port.

As an example of the method 6, it may be assumed that, when a plurality of resource regions (e.g., (E)CCE) is defined in one PRB pair and resource regions included in one E-PDCCH are limited to the same PRB pair, k contiguous resource regions from a resource region n as a start point may be aggregated and one E-PDCCH is transmitted. Here, the resource region n that is a resource region in which aggregation of regions of the corresponding E-PDCCH begins (i.e., a resource region with a minimum index during an aggregation procedure) may be a representative resource region. A final index that is actually occupied by each of the aggregated resource regions may be different from an index of a resource region during the aggregation procedure, and thus, the minimum index and the final index needs to be differentiated during the aggregation procedure. For example, in k (i.e., n, n+1, n+2, . . . , n+k−1) contiguous resource regions from the resource region n as a start point, resource regions n+1, n+2, . . . , n+k−1 may be present on a different PRB from a PRB pair in which the resource region n is present. In this case, in consideration of a condition in which resource regions included in one E-PDCCH are limited to the same PRB pair, resource regions n, n+1−P, n+2−P, . . . , n+k−1−P (here, P is given such that resource regions n+1−P, n+2−P, n+k−1−P are present in the same PRB pair as the PRB pair in which the resource region n is present) may be aggregated to constitute one E-PDCCH. In this case, even if the resource region n does not have a minimum index in a finally denoted resource region index, the resource region n may be determined as a resource region with a minimum index from a viewpoint of the aggregation procedure, and accordingly, the resource region n may be determined as the representative resource region.

As another example of the method 6, it may be assumed that one PRB pair is divided into P resource regions and resource regions Pt, Pt+1, Pt+P−1 are defined in a $t^{th}$ (t=0, 1, . . . ) PRB pair. For example, when P=3, resource regions 0, 1, and 2 may be defined in a $0^{th}$ PRB pair, resource regions 3, 4, and 5 may be defined in a first PRB pair, and resource regions 6, 7, and 8 may be defined in a second PRB pair. In this case, when resource regions Pt+P−1 and Pt+P are aggregated, a resource region index Pt+X may be substituted with an index as a result obtained by performing calculation Pt+(X mod P) in order to prevent two resource regions from being positioned in different PRB pairs. In the aforementioned example, a resource region Pt+P may be substituted with Pt as a result of Pt+(P mod P). That is, resources regions Pt+P−1 and Pt that belong to the same PRB may be aggregated. Here, the resource region Pt+P−1 with a minimum original index may be a representative resource region among aggregated resource regions. Overview of calculation of a final resource region index will now be described. When adjacent resource regions are aggregated using a resource region Pt+n as a start point, resource regions Pt+((n+k) mod P (k=0, 1, . . . ) may be aggregated, and a resource region Pt+n with a minimum original index may be determined as a representative resource region.

Method 7—An antenna port used to detect a representative resource region (e.g., (E)CCE) may be determined as a representative antenna port, and in this regard, when information about the representative resource region may be pre-transmitted via a higher layer signal such as an RRC or priorities between resource regions may be predetermined and a plurality of resource regions is used, a resource region with highest priority may be determined as the representative resource region. Alternatively, when a plurality of resource regions is aggregated to constitute one E-PDCCH, priority may be determined according to a candidate with a lower aggregation level is configured in each resource region. For example, one E-PDCCH and resource regions 1 and 2 are aggregated and are transmitted with an aggregation level 2, since a candidate of an aggregation level 1 using the resource region 1 is present, the UE attempts to detect an E-PDCCH in a corresponding resource region. On the other hand, since the candidate of the aggregation level 1 is not present in the resource region 2, if the UE does not attempts to detect the E-PDCCH, the resource region 1 may be determined as the representative resource region in order to reuse channel estimation.

In the methods 1 to 7, even if one E-PDCCH is transmitted using a plurality of resource regions (e.g., (E)CCE), different scrambling sequence parameters (e.g., SCIDs) may be mapped to respective resource regions, a representative SCID parameter may be determined based on an index of the SCID using the methods 1 to 3, or the representative resource region may be determined based on the index of the resource region and the SCID mapped to the representative resource region may be determined as a representative SCID parameter.

Hereinafter, an example of a method using a representative antenna port determined using one of the aforementioned methods will be described.

From a viewpoint of an eNB, one representative antenna port may be used to map an E-PDCCH to a resource element. From a viewpoint of a UE, an antenna port of an RS to be used for demodulation of the E-PDCCH may be determined as the representative antenna port. In this regard, the representative antenna port may be determined using one or more methods among the methods 1 to 7. This method may be effective to a case in which a plurality of resource regions used for one E-PDCCH is positioned in one PRB pair or in adjacent PRB pairs. This is because a channel status is maintained in one PRB pair or adjacent PRB pairs, and thus, individual resource regions cannot be channel-estimated using a separate RS and one channel estimation can be performed using an RS of one representative antenna port. Accordingly, transmission power of an RS that is not an RS of a representative antenna port, may be allocated to an RS of the representative antenna port to enable power boosting, thereby achieving more accurate channel estimation.

Figure 6:
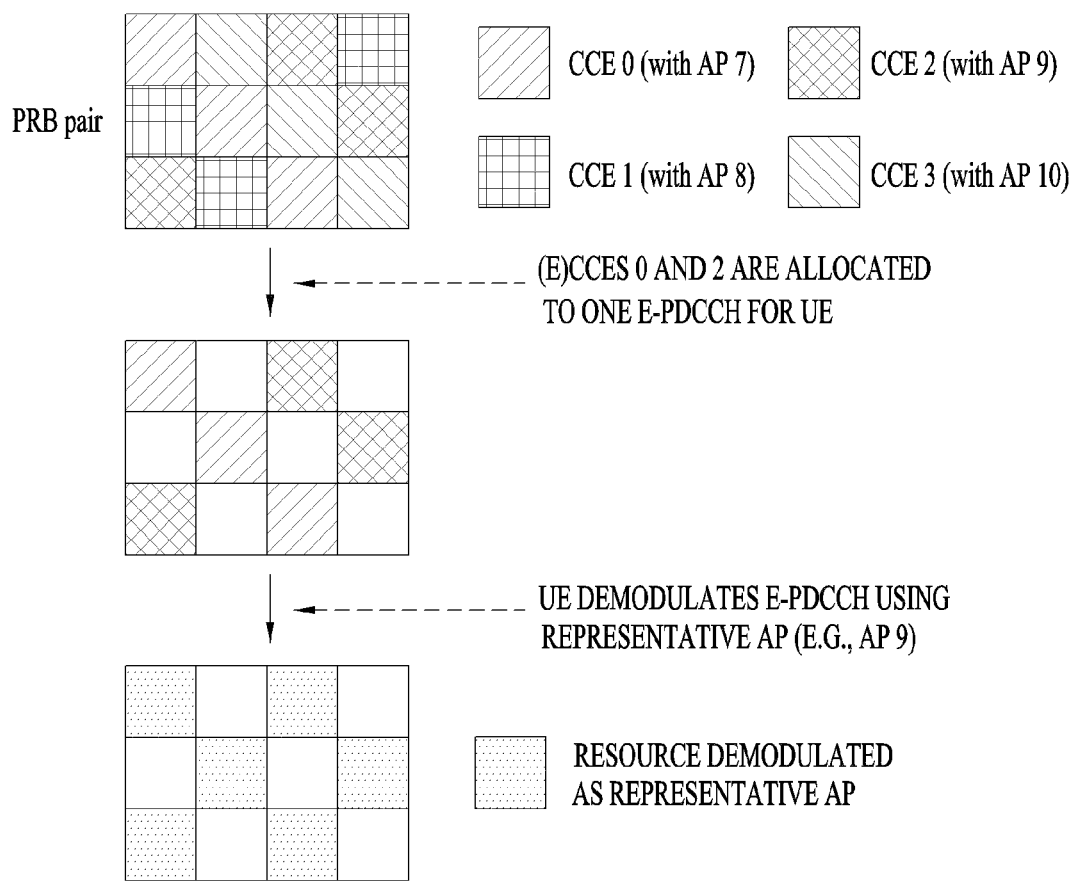
FIGS. 6 and 7 are diagrams for explanation of an operation of demodulating an E-PDCCH transmitted through a plurality of resource regions using a representative antenna port according to an embodiment of the present invention.
Figure 7:
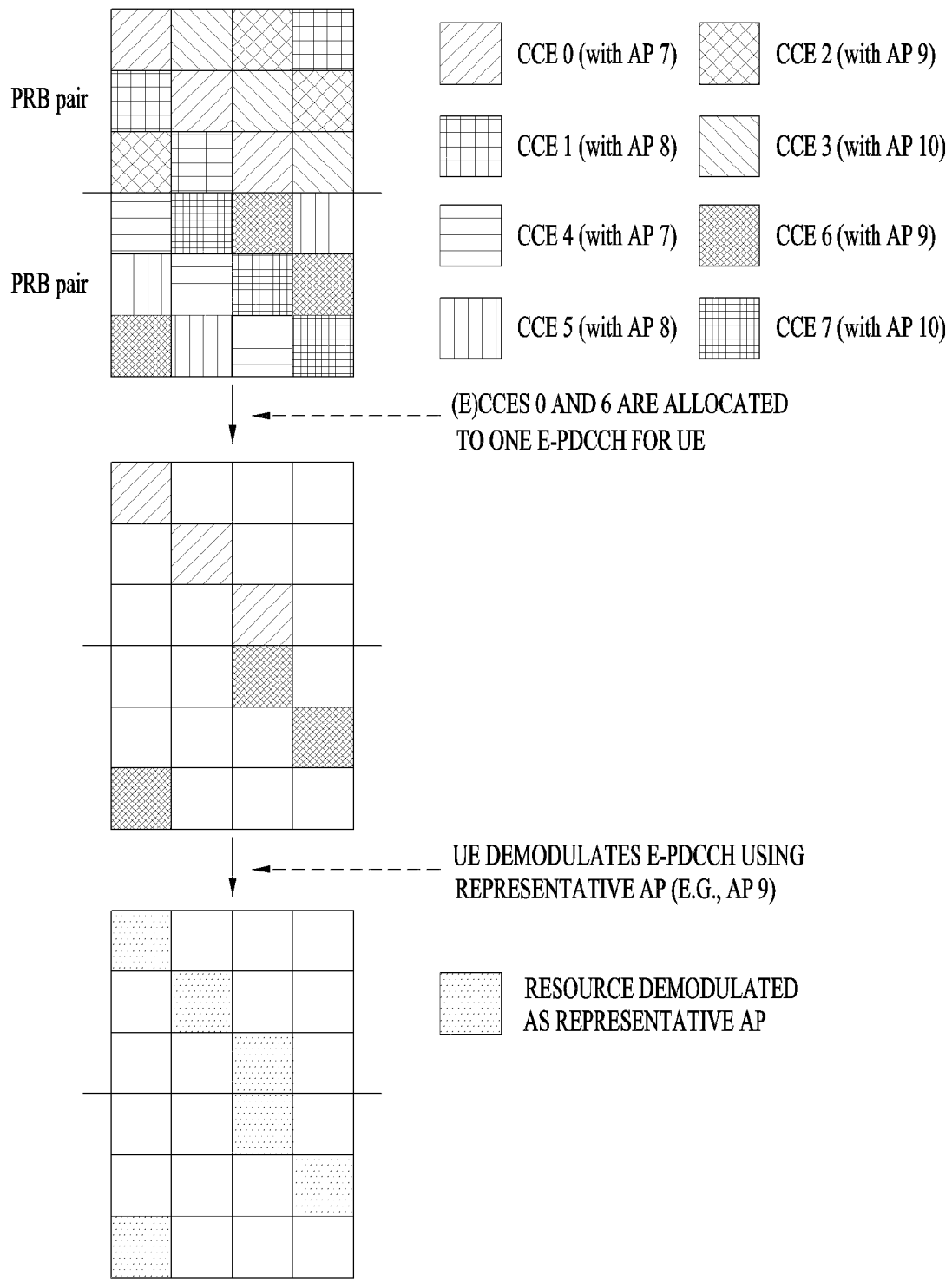

FIGS. 6 and 7 are diagrams for explanation of an operation of demodulating an E-PDCCH transmitted through a plurality of resource regions using a representative antenna port according to an embodiment of the present invention. FIG. 6 illustrates a case of one PRB pair and FIG. 7 illustrates a case of adjacent PRB pairs.

In the example of FIG. 6, it is assumed that one PRB pair is divided into four (E)CCEs and antenna ports 7, 8, 9, and 10 are mapped to respective (E)CCEs. FIG. 6 illustrates the example in which an eNB uses (aggregates) (E)CCE 0 and (E)CCE 2 and transmits a single E-PDCCH to a UE. In this case, the UE may determine a representative antenna port of two resource regions (i.e., (E)CCEs 0 and 2) according to one or more methods of the aforementioned methods. For example, it is assumed that AP 9 (or AP 109) is selected as the representative antenna port. Accordingly, a channel can be estimated using an RS (UE-specific RS or DMRS) corresponding to the representative antenna port in the two (E)CCEs, and E-PDCCH demodulation can be used based on the estimated channel.

FIG. 7 illustrates the example in which two resource regions (i.e., (E)CCEs 0 and 6) positioned in adjacent PRB pairs are aggregated and one E-PDCCH is transmitted. In the example of FIG. 7, when the representative antenna port is determined as AP 9 (or AP 109), the UE may estimate an RS corresponding to the representative antenna port and perform E-PDCCH demodulation based on the estimated channel.

One or more of the methods 1 to 9 of determination of a representative antenna port may be complexly used.

For example, like in the method 5 or 6, the representative antenna port may be determined as an antenna port used to detect the representative resource region (e.g., a resource region with a minimum index). The used method is advantageous in that the method can be used together with various operations for defining a representative resource region associated with resource regions, for example, an operation for selecting an ACK/NACK resource connected to a resource region. In addition, like in the method 3, 4, or 7, the method is advantageous in that antenna ports between cells do not overlap each other to prevent interference between RSs when priority for determining the representative antenna port is determined via a higher layer signal such as an RRC, etc. In order to provide these advantages it may be complexly apply the aforementioned methods. In this regard, for example, the representative antenna port may be determined as an antenna port allocated to a representative resource region with a minimum index. In this regard, an index of each resource region may be determined via a higher layer signal such as an RRC, etc.

Figure 8:
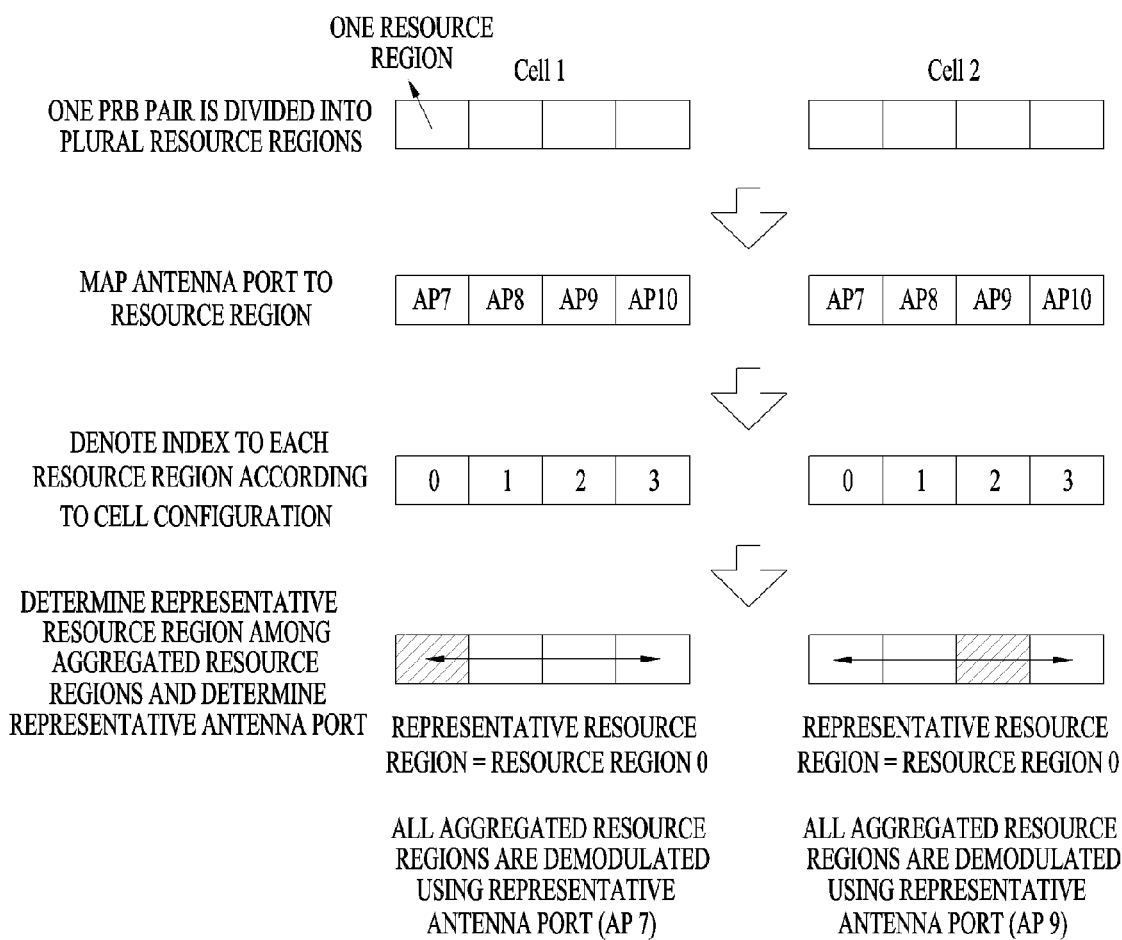
FIG. 8 is a diagram for explanation of an operation of demodulating an E-PDCCH transmitted through a plurality of resource regions using a representative antenna port according to another embodiment of the present invention.

FIG. 8 is a diagram for explanation of an operation of demodulating an E-PDCCH transmitted through a plurality of resource regions using a representative antenna port according to another embodiment of the present invention. FIG. 8 illustrates the example in which two adjacent cells allocate antenna ports to resource regions (e.g., (E)CCE) present in the same PRB pair using the same method and denotes resource region indexes (e.g., (E)CCE indexes) using different methods. Accordingly, even if all resource regions of the corresponding PRB pair are aggregated, representative resource regions (e.g., resource region with a minimum index in each cell) and representative antenna ports mapped to the respective representative resource regions may be determined not to overlap (or to be different) between cells.

In the example of FIG. 8, since a cell 1 and a cell 2 denote indexes for resource regions using different methods, even if the indexes (i.e., lowest index) of representative resource regions are the same value, 0, positions of physical resource regions that are actually indicated by the respective resource region indexes may be differently determined, and thus, different representative resource regions may be determined for the respective cells. Accordingly, antenna ports (i.e., representative antenna ports) mapped to the determined representative resource regions may also be differently determined In the example of FIG. 8, a UE that belongs to the cell 1 may determine a resource region (a first resource region from a viewpoint of a physical resource position) corresponding to a resource region index 0 as a representative resource region, determine an antenna port (i.e., AP 7) corresponding to the determined representative resource region as a representative antenna port, and demodulate all resource regions (resource region indexes 0 to 3) of one E-PDCCH using an RS corresponding to the representative antenna port. A UE that belong to the cell 2 may determine a resource region (a third resource region from a viewpoint of a physical resource position) corresponding to a resource region index 0 as representative resource region, determine an antenna port (i.e., AP 9) corresponding to the determined representative resource region as the representative antenna port, and demodulate all resource regions (resource region indexes 0 to 3) of one E-PDCCH using an RS corresponding to the representative antenna port.

According to a method of denote an index for a resource region, an index for each resource region may be denoted directly via a higher layer signal such as an RRC or derived from parameters such as a cell ID, a UE ID, etc. according to a predetermined rule.

For example, the eNB may transmit a specific seed value to the UE via direct signaling or indirect signaling derived from other parameters. The UE may denote predetermined offset to an index of an E-PDCCH resource region (e.g., (E)CCE) based on the corresponding seed value transmitted from the eNB or correct (e.g., permutation, cyclic shift, or interleaving) a position of a resource region index to a pattern determined according to the corresponding seed value.

In the example of FIG. 8, when the cell 2 denotes an index to a resource region, offset corresponding to 2 is applied compared with an index denoted by the cell 1.

For inter-cell interference coordination (ICIC), a specific cell may transmit information about a method of denoting a resource region index by the cell and information about a standard (e.g., priority for each antenna port applied for determination of a representative antenna port, information about an antenna port allocated to each resource region, etc.) applied for determination of an antenna port to adjacent cells via backhaul, etc.

The aforementioned operation of determining the representative resource region and/or the operation of determining the representative antenna port can be applied to all E-PDCCH PRB pairs, can be applied in units of separate PRB pairs, or can be applied in units of PRB pair groups (e.g., a set of a predetermined number of adjacent PRB pairs). In particular, when channel estimation is performed in units of PRB pairs or in units of PRB pair groups, one representative antenna port may be selected from a PRB pair or a PRB pair group, and resource regions that belong to the same PRB pair or PRB pair group may be attempted to be detected as a corresponding representative antenna port among resource regions aggregated with a specific E-PDCCH (or demodulation of an E-PDCCH may be attempted using an RS corresponding to the corresponding representative antenna port).

Hereinafter, the aforementioned operation of determining a representative antenna port will be described with regard to an embodiment of the present invention in detail. As a representative example of the present invention, it is assumed that the method 4 is used among the aforementioned methods. That is, a detailed example of a method of defining a hash function based on other parameters such as an (E)CCE index, a port index, a UE ID, and a cell ID and determining a value of the function as a representative antenna port will be described.

When an aggregation level of an E-PDCCH is L, this means that one E-PDCCH includes an aggregation of L (E)CCEs. The L (E)CCEs may be represented by $\#n_{CCE}$, $\#n_{CCE}+1$, $\#n_{CCE}+2$, ..., $\#n_{CCE}+L-1$ (or $\#n_{ECCE}$, $\#n_{ECCE}+1$, $\#n_{ECCE}+2$, ..., $\#n_{ECCE}+L-1$).

An index of an antenna port (AP) allocated (or mapped) to each (E)CCE may be determined as follows.

Example 1

Four (E)CCEs may be formed in one PRB pair, and APs #p, #p+1, #p+2, and #p+3 may be sequentially allocated in an order of the (E)CCEs. The example can be applied to a case in which four or more APs are defined like a normal CP subframe and the number of REs that can be used as an E-PDCCH is also sufficient.

Example 2

Two (E)CCEs may be formed in one PRB pair, and APs #p and #p+2 may be sequentially allocated in an order of the (E)CCEs. The example can be applied to a case in which four or more APs are defined like a normal CP subframe but the number of REs that can be used as an E-PDCCH is not sufficient and thus only two (E)CCEs are formed in one PRB pair.

In this case, since DMRSs (i.e., DMRS ports #p and #p+2), which are positioned away from each other by as much as 2 in an AP index, are used, the DMRSs may be transmitted to be independently consumed in different REs. For example, DMRS ports 7 and 8 (or 107 and 108) may be multiplexed and transmitted using a CDM method via different orthogonal cover codes in the same RE, and DMRS ports 9 and 10 (or 109 and 110) may be multiplexed and transmitted using a CDM method via different orthogonal cover codes in other the same RE. Liked in the aforementioned example 2, when APs 7 and 9 (or APs 107 and 109) are allocated to two (E)CCEs, since positions of REs for transmission of a DMRS of APs 7 and 9 (or 107 and 109) are different, respective values of RE transmission power can be applied to the APs.

Example 3

Two (E)CCEs may be formed in one PRB pair, and APs #p and #p+1 may be sequentially allocated in an order of the (E)CCEs. The example can be applied to a case in which only two APs are defined like an extended CP subframe.

Here, a representative AP index for the E-PDCCH may be determined according to a function (e.g., a hash function) of Equation 5 below.

$$AP=p+\{(n_{CCE} \bmod d)+(X \bmod L)\}*Z \text{ or}$$

$$AP=p+\{(n_{ECCE} \bmod d)+(X \bmod L)\}*Z \quad \text{[Equation 5]}$$

In addition, a representative AP index may be determined according to a function of Equation 6 below. Equation 6 below may be defined to limit selection of one of d AP indexes as a representative AP index when an aggregation level of an E-PDCCH exceeds the number of (E)CCEs formed on one PRB pair, d.

$$AP=p+\{(n_{CCE} \bmod d)+(X \bmod \min(L,d))\}*Z \text{ or}$$

$$AP=p+\{(n_{ECCE} \bmod d)+(X \bmod \min(L,d))\}*Z \quad \text{[Equation 6]}$$

In Equations 5 and 6 above, p refers to a minimum value (i.e., 7 or 107) of a DMRS port index (a port index 7, 8, 9, or 10, or a port index 107, 108 109, or 110) used by an E-PDCCH. $n_{CCE}$ or $n_{ECCE}$ refers to a lowest value among indexes of (E)CCE used for E-PDCCH transmission (e.g., which may be represented by $n_{CCE,low}$ or $n_{ECCE,low}$). D refers to the number of (E)CCEs formed on one PRB pair (e.g., which may be represented by $N_{RB}^{CCE}$ or $N_{RB}^{ECCE}$). X corresponds to a parameter (e.g., a UE ID) for determination of priority for configuring a representative AP (e.g., a UE ID may be set as $n_{RNTI}$ and in this case, $X=n_{RNTI}$ may be satisfied). In addition, since L is an aggregation level, L refers to the number of (E)CCEs used in one E-PDCCH (e.g., which may be represented by $N^{CCE}_{EPDCCH}$ or $N^{ECCE}_{EPDCCH}$). min(a,b) refers to a minimum value of a and b. Z has a value 1 or 2. In this regard, like in the example 1 or 3, when an interval of APs allocated to two (E)CCEs is 1 (e.g., in the case of AP indexes 7 and 8 (or 107 and 108)), Z=1 may be given, and like in the example 2, when an interval of APs allocated to two (E)CCEs is 2 (e.g., in the case of AP indexes 7 and 9 (or 107 and 109)), Z=2 may be given.

Equations 7 and 8 below may be given in the same meaning as the method of determining a representative AP according to Equation 6 above.

$$n'=(n_{CCE} \bmod d)+(X \bmod \min(L,d)) \text{ or}$$

$$n'=(n_{ECCE} \bmod d)+(X \bmod \min(L,d)) \quad \text{[Equation 7]}$$

TABLE 8

| | Representative AP = p + n' * Z (p = 7 (or 107)) | | |
| --- | --- | --- | --- |
| n' | Example 1 (Z = 1) | Example 2 (Z = 2) | Example 3 (Z = 1) |
| 0 | 7 (or 107) | 7 (or 107) | 7 (or 107) |
| 1 | 8 (or 108) | 9 (or 109) | 8 (or 108) |
| 2 | 9 (or 109) | — | — |
| 3 | 10 (or 110) | — | — |

In Equation 7 and Table 8 above, n' may correspond to a parameter for determination of an index of a resource region (e.g., (E)CCE) of an E-PDCCH, which is derived from a predetermined parameter X (e.g., an identifier of a UE). For example, n' may refer to a parameter for determination of a representative resource region (or a representative (E)CCE) index) of the E-PDCCH. That is, Equation 7 and Table 8 above show that the representative AP corresponds (or is mapped) to a representative (E)CCE. In Table 8 above, as described above, the example 1 corresponds to a case in which the number of resources (e.g., OFDM symbols or resource elements) that can be used for an E-PDCCH in a normal CP subframe is equal to or greater than a predetermined reference value or a case in which the number of (E)CCEs defined in one PRB is 4, since Z=1 is satisfied, an interval between APs may be determined as 1. In Table 8 above, as described above, the example 2 corresponds to a case in which the number of resources that can be used for an E-PDCCH in a normal CP subframe is less than a predetermined reference value or a case in which the number of (E)CCEs defined in one PRB is 2, since Z=2, an interval between APs may be determined as 2. In Table 8, the example 3 corresponds to a case of an extended CP subframe. In this case, since up to two APs may be used for an E-PDCCH and Z=1 is given, an interval between APs may be determined as 1.

The parameter X may be a value (i.e., the parameter X is a value derived from a UE ID) for determination of a representative AP by a UE ID. For example, when the UE ID is given as $n_{RNTI}$, X may be given as a function value $Y_k$ used for determination of a search space of a PDCCH in a 3GPP LTE system. For example, $Y_k$ may be determined by a UE ID (e.g., $n_{RNTI}$) according to Equation 8 below.

$$Y_k=(A \cdot Y_{k-1}) \bmod D, Y_{-1}=n_{RNTI} \neq 0 \quad \text{[Equation 8]}$$

In Equation 8 above, k refers to a subframe index. A and D may be determined as appropriate numbers, for example, A=39827 and D=65537.

In Equations 5 and 6 above, when an aggregation level is 1 (that is, L=1), since a result of calculation X mod L is 0, the parameter X does not affect determination of the representative AP, and APs that are sequentially allocated according to positions of corresponding (E)CCEs of each PRB pair may be used as a representative AP. When an aggregation level is 1, one E-PDCCH constitutes one (E)CCE, and thus, an AP mapped to corresponding one (E)CCE is a representative AP.

In the case of L≥2, one (E)CCE present between a first (E)CCE and a last (E)CCE may be determined according to X, and an AP allocated (or mapped) to the one determined (E)CCE may be determined as a representative AP.

In Equations 5 and 6 above, X may be determined as a value derived from a parameter such as a UE ID, etc. However, alternatively, in order to directly adjust selection of a representative AP, an eNB may directly indicate a value to be used as X via a higher layer signal.

As described above, while a representative (E)CCE (or a representative AP) used for detection of an E-PDCCH (or demodulation of an E-PDCCH) is selected, a plurality of E-PDCCH sets may be set for a UE.

For example, the eNB may configure two E-PDCCH sets (i.e., E-PDCCH set1 and E-PDCCH set2) for one UE and may appropriately distribute an E-PDCCH candidate monitored by the corresponding UE to the two E-PDCCH sets. Here, the two E-PDCCH sets may or may not overlap each other in a PRB region, and parameters such as DMRS scrambling sequences, the number of used PRBs, or the like may be differently set.

When the plural E-PDCCH sets are configured, a method of configuring a representative (E)CCE (or a representative AP) may be differently determined for each respective E-PDCCH set. For example, when a representative AP is determined according to a function according to Equation 5 or 6 above, the parameter X used for determination of an AP index may be differently determined in the plural E-PDCCH sets. When a reference for configuring a representative AP for a first UE is differently given for each respective E-PDCCH sets, even if the same reference as that of a second UE is used to select an AP in one E-PDCCH (e.g., E-PDCCH set1) among the plural E-PDCCH sets (i.e., when first and second UEs perform E-PDCCH demodulation using a DMRS of the same AP) and thus it is difficult to perform a MU-MIMO operation, a different reference from that of the second UE is used to select an AP with high possibility in another E-PDCCH set (e.g., when E-PDCCH set2) (i.e., when the first and second UEs perform E-PDCCH demodulation using DMRSs of different APs), and thus the MU-MIMO operation may be possible.

A parameter X (i.e., E-PDCCH set-specific) given for each respective E-PDCCH set may be derived from $Y_k$ according to Equation 8 above. For example, a parameter $X_1$ for E-PDCCH set1 is given as $Y_k$. On the other hand, a parameter $X_2$ for E-PDCCH set2 may be determined in the form of a value obtained by adding a predetermined number to $X_1$. A relationship between $X_1$ and $X_2$ may be defined according to Equation 9 below.

$$X_2=X_1+G^*M_{L,1} \quad \text{[Equation 9]}$$

In Equation 9 above, G is an integer that is equal to or greater than 1, and $M_{L,1}$ is the number of E-PDCCH candidates of an aggregation level L present in E-PDCCH set1. According to Equation 9 above, when a method of continuously distributing search spaces of E-PDCCH set1 and E-PDCCH set2 is applied, a start (E)CCE index of a search space is used as a reference for selection of a representative AP in each E-PDCCH set.

For another example, both $X_1$ and $X_2$ for E-PDCCHs set1 and set2 are determined according to Equation 8 above.

However, parameters A and/or D of Equation 8 may be differently set for $X_1$ and $X_2$ such that different $X_1$ and $X_2$ may be derived from the same UE ID (e.g., $n_{RNTI}$). Through this process, one UE may select a representative (E)CCE (or a representative AP) using different references for different E-PDCCH sets and perform E-PDCCH detection (or demodulation) using an RS corresponding to the selected representative AP.

As described above, a PUCCH resource linked with the selected/determined representative AP (or representative (E)CCE) may be used for ACK/NACK feedback. For example, when the representative AP is determined according to Equation 5 or 6 above, the representative (E)CCE is determined and an AP corresponding (or mapped) to the determined representative (E)CCE is determined as a representative AP. That is, the representative (E)CCE may correspond to a portion (i.e., n' of Equation 7) obtained by excluding p from Equation 5 or 6 above. For example, as the representative AP is determined by adding a minimum value (7 or 107) of an AP to n', n' and a representative (E)CCE index n* may be determined according to a one-to-one mapping relationship. When the representative (E)CCE is determined, a PUCCH linked with the representative (E)CCE may be used for ACK/NACK feedback.

For example, in the examples as a method of determining a PUCCH resource associated with an E-PDCCH, it is assumed that the UE determines a specific (E)CCE index n* among L (L=aggregation level) (E)CCEs, determine a PUCCH resource (e.g., $n^*+k+N_{offset}^{PUCCH}$) linked with an (E)CCE index n*+k obtained by applying predetermined offset (e.g., k) to the specific (E)CCE index, and feedback ACK/NACK.

Here, when the specific (E)CCE index n* is determined, n' in Equation 7 above may be considered. That is, the specific (E)CCE index n* may be determined as an index corresponding to n' determined in consideration of a UE ID (here, n' may be defined according to Equation 7 above). k corresponding to the predetermined offset may be indicated using a specific field of a DCI format of DL assignment. $N_{offset}^{PUCCH}$ may be an offset value indicating a start point of a PUCCH resource region and provided via higher layer signaling such as an RRC, etc. In addition, when one UE performs ACK/NACK transmission using two PUCCH resources, an index of a first PUCCH resource may be determined as $n^*+k+N_{offset}^{PUCCH}$ and an index of a second PUCCH resource may be determined as $n^*+k+N_{offset}^{PUCCH}+1$.

Figure 9:
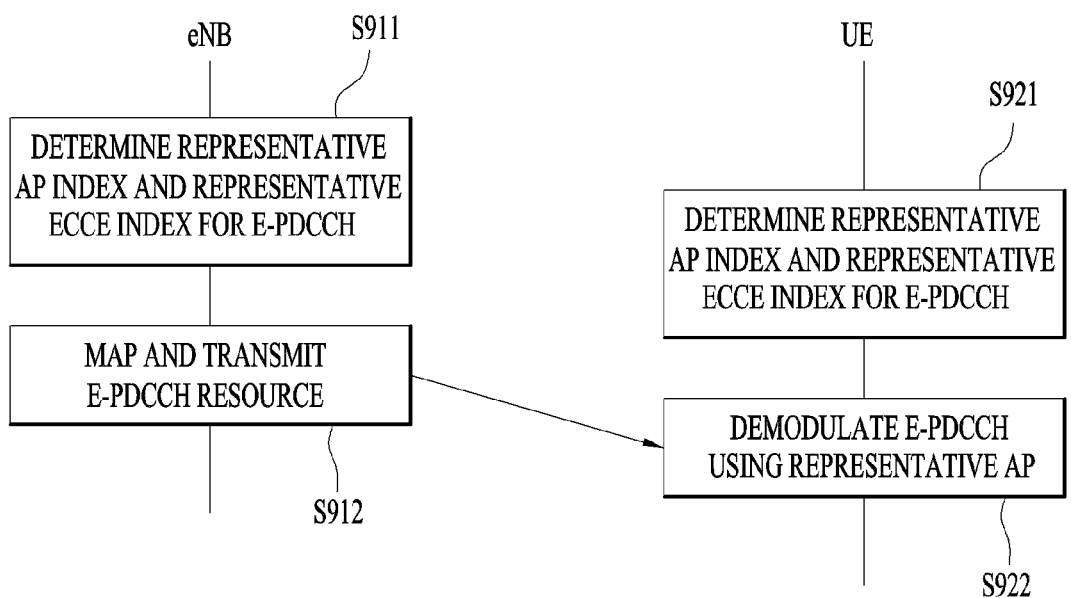
FIGS. 9 and 10 are flowcharts for explanation of an E-PDCCH-based operation method according to embodiments of the present invention.
Figure 10:
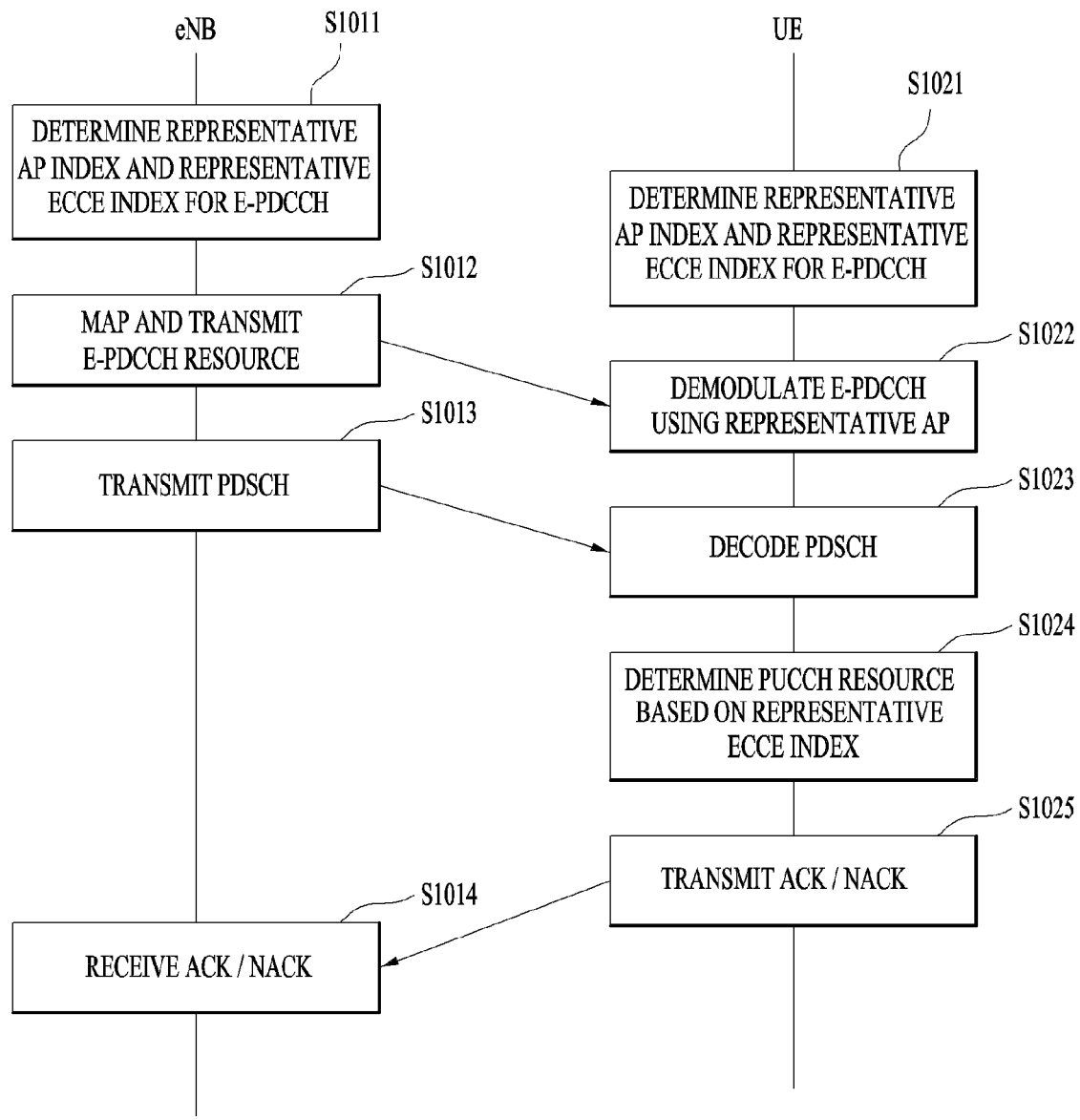

FIGS. 9 and 10 are flowcharts for explanation of an E-PDCCH-based operation method according to embodiments of the present invention.

An example of FIG. 9 relates to a method of determining an E-PDCCH representative AP and performing E-PDCCH transmission and reception according to the determined E-PDCCH representative AP.

In step S911 of FIG. 9, an eNB may determine a resource region to which an E-PDCCH is mapped for E-PDCCH transmission to a specific UE. Here, the eNB may determine a representative AP index corresponding (or mapped) to a representative (E)CCE index among resource regions to which an E-PDCCH is mapped. A method of determining the representative (E)CCE and/or the representative AP may be based on the aforementioned examples of the present invention. For example, the representative AP may be determined to correspond to a representative (E)CCE (e.g., n' of Equation 7 above) determined based on an identifier of the UE.

In step S912, the eNB may map an E-PDCCH to a resource element and transmit the E-PDCCH to the specific UE.

In step S921, the UE may determine a representative (E)CCE from information about a resource region in which the E-PDCCH is transmitted and determine a representative AP corresponding to the representative (E)CCE for E-PDCCH monitoring (i.e., decoding attempt). A method of determining the representative (E)CCE and/or the representative AP may be based on the aforementioned examples of the present invention. For example, the representative AP may be determined to correspond to the representative (E)CCE (e.g., n' in Equation 7 above) determined based on an identifier of the UE.

In step S922, the UE may perform E-PDCCH demodulation using the representative AP. For example, the UE may perform E-PDCCH demodulation using a channel estimated based on a DMRS corresponding to the representative AP.

The example of FIG. 10 relates to a method of determining a PUCCH resource when the UE feedbacks ACK/NACK information to transmission of a PDSCH indicated by an E-PDCCH to the eNB.

Steps S1011 and S1012 of FIG. 10 correspond to steps S911 and S912 of FIG. 9, and steps S1021 and S1022 of FIG. 10 correspond to steps S921 and S922 of FIG. 9. Thus, repeated descriptions are not given here.

In step S1013, the eNB may transmit DL data through a PDSCH scheduled according to DL assignment DCI transmitted through the E-PDCCH to the UE.

In step S1023, the UE may decode the PDSCH and generate ACK/NACK information according to whether decoding is successful.

In step S1024, the UE may determine a PUCCH resource (e.g., PUCCH format 1a/1b resources) for transmission of the generated ACK/NACK information. Here, the UE may determine a representative (E)CCE (e.g., n' in Equation 7 above) determined based on a identifier of the UE among (E)CCEs of an E-PDCCH associated with the PDSCH and determine a PUCCH resource corresponding to the representative (E)CCE.

In step S1025, the UE may transmit ACK/NACK information using the determined PUCCH resource to the eNB.

In step S1014, the eNB may receive the ACK/NACK information from the UE. From a viewpoint of the eNB, the eNB may determine a PUCCH resource using the same method as a method of determining a PUCCH resource for transmission of the ACK/NACK information by the UE and attempt to receive the ACK/NACK information.

Descriptions of the aforementioned various embodiments of the present invention can be independently applied or two or more embodiments can be simultaneously applied, and a repeated description is not given for clarity.

According to the various embodiments of the present invention, a DL transmission entity or a UL reception entity is mainly an eNB and a DL reception entity or a UL transmission entity is mainly a UE. However, the scope of the present invention is not limited thereto. That is, the aforementioned principle of the various embodiments of the present invention can also be applied to a case in which a relay is a DL transmission entity to the UE or a UL reception entity from the UE, or a case in which when a relay is a UL transmission entity to the eNB or a DL reception entity from the eNB.

Figure 11:
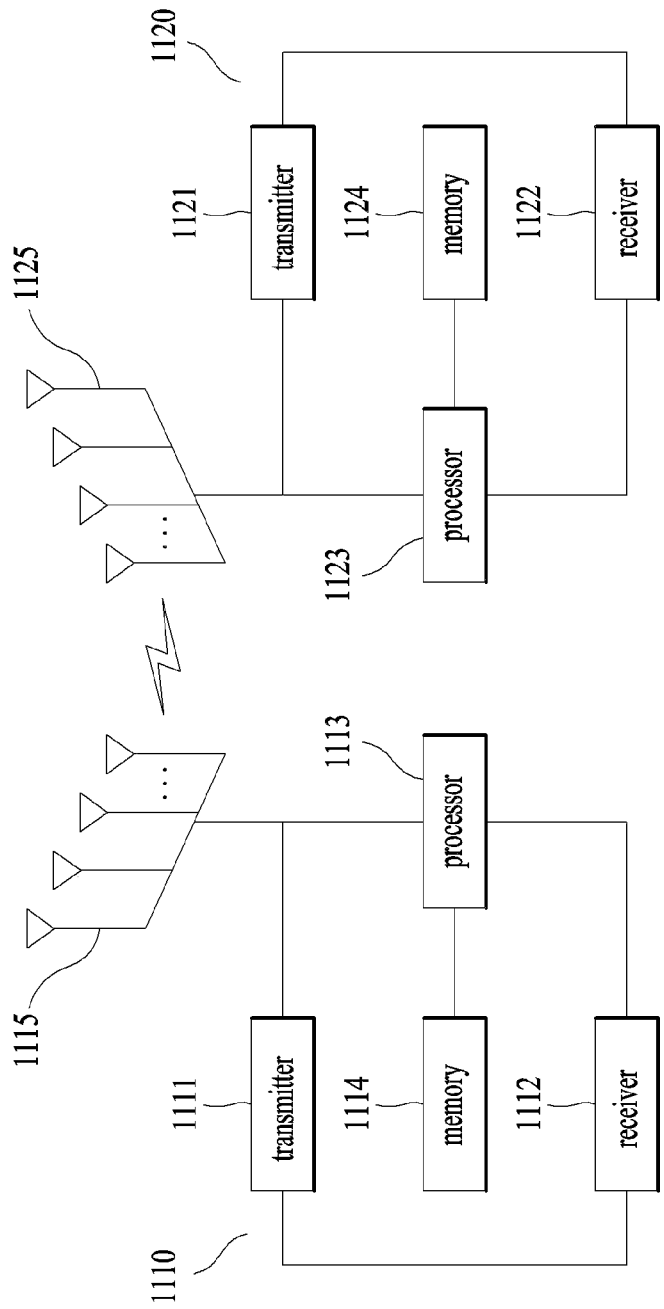
FIG. 11 illustrates configurations of an eNB and a user equipment (UE) according to an embodiment of the present invention.

FIG. 11 illustrates configurations of an eNB 1110 and a UE 1120 according to an embodiment of the present invention.

Referring to FIG. 11, the eNB 1110 may include a transmitter 1111, a receiver 1112, a processor 1113, a memory 1114, and a plurality of antennas 1115. The plural antennas 1115 represents that the eNB 1110 supports MIMO transmission/reception. The transmitter 1111 may transmit signals, data and information to external apparatuses (e.g., UEs). The receiver 1112 may receive signals, data, and information from external apparatuses (e.g., UEs). The processor 1113 may control an overall operation of the eNB 1110.

According to an embodiment of the present invention, the eNB 1110 may be configured to transmit a DL control channel (e.g., an E-PDCCH). The processor 1113 of the eNB 1110 may be configured to determine one antenna port (i.e., a representative AP) used for the UL control channel. In addition, the processor 1113 may be configured to map the DL control channel to a resource element using the one determined antenna port. In addition, the processor 1113 may be configured to transmit the mapped DL control channel to the UE 1120 using the transmitter 1111. Here, an index of the one antenna port (i.e., a representative AP) may be determined according to various methods according to the present invention. For example, one representative AP index may be determined based on an (E)CCE index derived from an identifier of the UE 1120.

According to another embodiment of the present invention, the eNB 1110 may be configured to receive ACK/NACK information. The processor 1113 of the eNB 1110 may be configured to transmit a DL control channel (e.g., an E-PDCCH) for carrying scheduling information of DL data and a DL data channel indicated by the DL control channel to the UE 1120 using the transmitter 1111. The processor 1113 may be configured to receive ACK/NACK feedback information to the DL data channel from the UE 1120 through a UL control channel (e.g., PUCCH) resource using a receiver 1122. Here, an index of the PUCCH may be determined using the aforementioned various methods according to the present invention. For example, the index of the PUCCH resource may be determined based on an (E)CCE index derived from an identifier of the UE 1120.

The processor 1113 of the eNB 1110 may also perform a function of calculation-processing information received by the eNB 1110, information to be externally transmitted, etc., and the memory 1114 may store the calculation-processed information, etc. for a predetermined period of time and may be replaced with a component such as a buffer (not shown).

Referring to FIG. 11, the UE 1120 according to the present invention may include a transmitter 1121, a receiver 1122, a processor 1123, a memory 1124, and a plurality of antennas 1125. The plural antennas 1125 may refer to a UE apparatus for supporting MIMO transmission and reception. The transmitter 1121 may transmit various signals, data, and information to an external apparatus (e.g., an eNB). The receiver 1122 may receive various signals, data, and information from an external apparatus (e.g., an eNB). The processor 1123 may control an overall operation of the UE 1120.

According to an embodiment of the present invention, the UE 1120 may be configured to receive a DL control channel (e.g., an E-PDCCH). The processor 1123 of the UE 1120 may be configured to determine one antenna port (i.e., a representative AP) used for the DL control channel. In addition, the processor 1123 may receive the DL control channel through the receiver 1122 using the one antenna port, and demodulation of the DL control channel may be based on an RS (a UE-specific RS or DMRS) for the one antenna port. Here, an index of the one antenna port (i.e., a representative AP) may be determined according to the aforementioned various methods of the present invention. For example, the index of the one representative AP may be determined based on the (E)CCE index derived from an identifier of the UE 1120.

According to another embodiment of the present invention, the UE 1120 may be configured to transmit ACK/NACK information. The processor 1123 of the UE 1120 may be configured to transmit ACK/NACK information to a DL data channel through the transmitter 1121 using a UL control channel resource. Here, the index of the PUCCH may be determined using the aforementioned various methods of the present invention. For example, the index of the PUCCH resource may be determined based on the (E)CCE index derived from the identifier of the UE 1120.

The processor 1123 of the UE 1120 may calculate and process information received by the UE 1120, information to be transmitted to the outside, etc. The memory 1124 may store the calculated and processed information for a predetermined time and may be replaced by a component such as a buffer (not shown).

The detailed configurations of the eNB 1110 and the 1120 may be implemented such that the aforementioned embodiments of the present invention can be independently applied thereto or two or more embodiments can be simultaneously applied thereto, description of redundant parts is omitted for clarity.

Description of the eNB 1110 in FIG. 13 may be equally applied to an apparatus as a downlink transmitter or an uplink receiver and description of the UE 1120 may be equally applied to a relay as a downlink receiver or an uplink transmitter.

The embodiments of the present invention may be implemented by various means, for example, hardware, firmware, software, or combinations thereof When the embodiments of the present invention are implemented using hardware, the embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention can be applied to various mobile communication systems.

The invention claimed is:

1. A method of transmitting acknowledgement/negative-acknowledgement (ACK/NACK) information by a user equipment (UE) in a wireless communication system, the method comprising:
receiving downlink control information (DCI) through a downlink (DL) control channel from a eNB;
transmitting ACK/NACK information corresponding to the DCI through an uplink (UL) control channel resource,
wherein an index of the UL control channel resource is determined by applying at least one of a first offset value or a second offset value to a start offset of the UL control channel resource region signaled via a higher layer;
wherein the first offset value corresponds to an index of the antenna port used for the DL control channel transmission; and
wherein the second offset value corresponds to a predetermined field of a DCI format of the DL control channel.

2. The method according to claim 1, wherein when the UL control channel resource and an additional UL control channel resource is used in order to transmit the ACK/NACK information, an index of the additional UL control channel resource is determined according to the index of the UL control channel resource+1.

3. A method of receiving acknowledgement/negative-acknowledgement (ACK/NACK) information by eNB in a wireless communication system, the method comprising:
transmitting a downlink control information (DCI) through a downlink (DL) control channel to a UE;
receiving ACK/NACK information corresponding to the DCI through an uplink (UL) control channel resource,
wherein an index of the UL control channel resource is determined by applying at least one of a first offset value or a second offset value to a start offset of the UL control channel resource region signaled via a higher layer;
wherein the first offset value corresponds to an index of the antenna port used for the DL control channel transmission; and
wherein the second offset value corresponds to a predetermined field of a DCI format of the DL control channel.

4. The method according to claim 3, wherein when the UL control channel resource and an additional UL control channel resource is used in order to transmit the ACK/NACK information, an index of the additional UL control channel resource is determined according to the index of the UL control channel resource+1.

5. A user equipment for transmitting acknowledgement/negative-acknowledgement (ACK/NACK) information by a user equipment (UE) in a wireless communication system, the user equipment comprising:
a receiver configured to receive downlink control information (DCI) through a downlink (DL) control channel from a base station;
a transmitter configured to transmit ACK/NACK information corresponding to the DCI through an uplink (UL) control channel resource,
a processor configured to control the receiver and transmitter,
wherein an index of the UL control channel resource is determined applying at least one of a first offset value or a second offset value to a start offset of the UL control channel resource region signaled via a higher layer;
wherein the first offset value corresponds to an index of the antenna port used for the DL control channel transmission; and
wherein the second offset value corresponds to a predetermined field of a DCI format of the DL control channel.

6. The user equipment according to claim 5, wherein when the UL control channel resource and an additional UL control channel resource is used in order to transmit the ACK/NACK information, an index of the additional UL control channel resource is determined according to the index of the UL control channel resource+1.

7. An eNB for receiving acknowledgement/negative-acknowledgement (ACK/NACK) information by eNB in a wireless communication system, the eNB comprising:
a transmitter configured to transmit a downlink control information (DCI) through a downlink (DL) control channel to a UE;
a receiver configured to receive ACK/NACK information corresponding to the DCI through an uplink (UL) control channel resource,
a processor configured to control the receiver and transmitter,
wherein an index of the UL control channel resource is determined by applying at least one of a first offset value or a second offset value to a start offset of the UL control channel resource region signaled via a higher layer;
wherein the first offset value corresponds to an index of the antenna port used for the DL control channel transmission; and
wherein the second offset value corresponds to a predetermined field of a DCI format of the DL control channel.

8. The eNB according to claim 7, wherein when the UL control channel resource and an additional UL control channel resource is used in order to transmit the ACK/NACK information, an index of the additional UL control channel resource is determined according to the index of the UL control channel resource+1.

9. The method according to claim 1, wherein the index of the UL control channel resource is determined by applying each of the first offset value and the second offset value to the start offset of the UL control channel resource region signaled via the higher layer.

10. The method according to claim 3, wherein the index of the UL control channel resource is determined by applying each of the first offset value and the second offset value to the start offset of the UL control channel resource region signaled via the higher layer.

11. The user equipment according to claim 5, wherein the index of the UL control channel resource is determined by applying each of the first offset value and the second offset value to the start offset of the UL control channel resource region signaled via the higher layer.

12. The eNB according to claim 7, wherein the index of the UL control channel resource is determined by applying each of the first offset value and the second offset value to the start offset of the UL control channel resource region signaled via the higher layer.

* * * * *